(12) United States Patent
Vasisht

(10) Patent No.: US 9,363,709 B2
(45) Date of Patent: Jun. 7, 2016

(54) METHOD, SYSTEM AND DEVICE FOR AUTOMATICALLY CONFIGURING A COMMUNICATIONS NETWORK

(76) Inventor: Samrat Vasisht, Roslindale, MA (US)

( * ) Notice: Subject to any disclaimer, the term of this patent is extended or adjusted under 35 U.S.C. 154(b) by 3018 days.

(21) Appl. No.: 10/740,762

(22) Filed: Dec. 22, 2003

(65) Prior Publication Data

US 2004/0133689 A1    Jul. 8, 2004

Related U.S. Application Data

(60) Provisional application No. 60/436,381, filed on Dec. 24, 2002, provisional application No. 60/457,625, filed on Mar. 26, 2003.

(51) Int. Cl.
| | |
|---|---|
| *G06F 15/16* | (2006.01) |
| *H04W 28/18* | (2009.01) |
| *H04L 29/12* | (2006.01) |
| *H04L 12/24* | (2006.01) |
| *H04N 21/41* | (2011.01) |
| *H04L 12/28* | (2006.01) |
| *H04L 29/06* | (2006.01) |

(52) U.S. Cl.
CPC ......... *H04W 28/18* (2013.01); *H04L 29/12216* (2013.01); *H04L 29/12283* (2013.01); *H04L 41/0803* (2013.01); *H04L 41/0859* (2013.01); *H04L 41/0883* (2013.01); *H04L 41/0886* (2013.01); *H04L 61/2007* (2013.01); *H04L 61/2061* (2013.01); *H04N 21/4126* (2013.01); *H04L 12/2805* (2013.01); *H04L 12/2807* (2013.01); *H04L 12/2836* (2013.01); *H04L 63/08* (2013.01); *H04L 63/162* (2013.01); *H04L 2012/2841* (2013.01); *H04L 2012/2843* (2013.01); *H04L 2012/2845* (2013.01); *H04L 2012/2849* (2013.01)

(58) Field of Classification Search
USPC ................................... 709/220, 228
See application file for complete search history.

(56) References Cited

U.S. PATENT DOCUMENTS

| | | |
|---|---|---|
| 5,655,148 A | 8/1997 | Richman et al. |
| 5,787,246 A | 7/1998 | Lichtman et al. |
| 5,805,897 A | 9/1998 | Glowny |
| 5,828,842 A | 10/1998 | Sugauchi et al. |
| 5,838,907 A | 11/1998 | Hansen |
| 5,845,078 A | 12/1998 | Tezuka et al. |

(Continued)

FOREIGN PATENT DOCUMENTS

| | | |
|---|---|---|
| WO | WO 96/25688 | 8/1996 |
| WO | WO 98/26548 | 6/1998 |

OTHER PUBLICATIONS

Joris Evers/IDG News Services; "Former Intel exec sets Wi-Fi crowd straight"; InfoWorld by Wireless; Dec. 3, 2003; 4 pages.

(Continued)

*Primary Examiner* — Adnan Mirza
(74) *Attorney, Agent, or Firm* — Nelson Mullins Riley & Scarborough LLP

(57) ABSTRACT

A system, method, device, and computer program product for configuring a communications network for a user, including assigning a network identifier to a communications network of a user, the network identifier being unique to an instantiation of the communications network; and automatically generating a plurality of unique network configuration settings for one or more network devices of the communications network based on the network identifier.

41 Claims, 8 Drawing Sheets

(56) References Cited

U.S. PATENT DOCUMENTS

| | | | |
|---|---|---|---|
| 5,901,288 A | 5/1999 | Kihara et al. | |
| 5,959,536 A | 9/1999 | Chambers et al. | |
| 5,960,167 A | 9/1999 | Roberts et al. | |
| 6,012,088 A | 1/2000 | Li et al. | |
| 6,012,100 A | 1/2000 | Frailong et al. | |
| 6,018,769 A | 1/2000 | Tezuka et al. | |
| 6,041,347 A | 3/2000 | Harsham et al. | |
| 6,052,720 A | 4/2000 | Traversat et al. | |
| 6,067,568 A | 5/2000 | Li et al. | |
| 6,105,100 A | 8/2000 | Dean et al. | |
| 6,108,779 A | 8/2000 | Dean et al. | |
| 6,161,176 A | 12/2000 | Hunter et al. | |
| 6,170,009 B1 | 1/2001 | Mandal et al. | |
| 6,175,860 B1 | 1/2001 | Gaucher | |
| 6,209,031 B1 | 3/2001 | Casey et al. | |
| 6,212,585 B1 | 4/2001 | Chrabaszcz | |
| 6,243,745 B1 | 6/2001 | Casey et al. | |
| 6,263,387 B1 | 7/2001 | Chrabaszez | |
| 6,295,556 B1 | 9/2001 | Falcon et al. | |
| 6,314,459 B1 | 11/2001 | Freeman | |
| 6,385,648 B1 | 5/2002 | Philippou et al. | |
| 6,449,642 B2 | 9/2002 | Bourke-Dunphy et al. | |
| 6,466,972 B1 | 10/2002 | Paul et al. | |
| 6,493,751 B1 | 12/2002 | Tate et al. | |
| 6,516,347 B1 | 2/2003 | Nakamura | |
| 6,587,874 B1 | 7/2003 | Golla et al. | |
| 6,697,360 B1* | 2/2004 | Gai et al. | 370/389 |
| 6,944,653 B2* | 9/2005 | Fong et al. | 709/220 |
| 7,054,296 B1* | 5/2006 | Sorrells et al. | 370/338 |
| 7,181,530 B1* | 2/2007 | Halasz et al. | 709/238 |
| 2002/0035621 A1* | 3/2002 | Zintel et al. | 709/220 |
| 2002/0059413 A1 | 5/2002 | Kaski et al. | |
| 2002/0075844 A1* | 6/2002 | Hagen | 370/351 |
| 2002/0108002 A1* | 8/2002 | Gifford et al. | 710/36 |
| 2002/0161867 A1 | 10/2002 | Cochran et al. | |
| 2003/0041125 A1* | 2/2003 | Salomon | 709/220 |
| 2003/0078072 A1 | 4/2003 | Serceki et al. | |
| 2003/0154287 A1 | 8/2003 | Sullivan | |
| 2003/0167405 A1 | 9/2003 | Freund et al. | |
| 2003/0200285 A1* | 10/2003 | Hansen et al. | 709/220 |
| 2003/0204748 A1 | 10/2003 | Chiu | |
| 2003/0235175 A1* | 12/2003 | Naghian et al. | 370/338 |
| 2004/0003060 A1* | 1/2004 | Asoh et al. | 709/220 |

OTHER PUBLICATIONS

Ralph Droms, Bucknell University; "Automated Configuration of TCP/IP With DHCP"; IEEE Internet Computing; Jul.-Aug. 1999; pp. 45-53.

Cuneyt Akinlar, et al; "IP Address Configuration Algorithms for Routerless and Single-Router Zeroconf Networks;" 2002 IEEE/Computer Society; 6 pages.

Tracy T. Thomas; "Protocols Support Home Gateway Applications (Technology Information)"; Electronic Engineering Times; vol. 98; Feb. 28, 2000; 3 pages.

"Faster Wireless Networking"; PC Magazine, Jun. 11, 2002; 2 pages.

Lenny Bailes; "Instant Networking Kits Link SOHO PCs"; Window Magazine, No. 1008, p. 66; 1999.

International Search Report (PCT/US 03/40813) mailed Aug. 11, 2004.

* cited by examiner

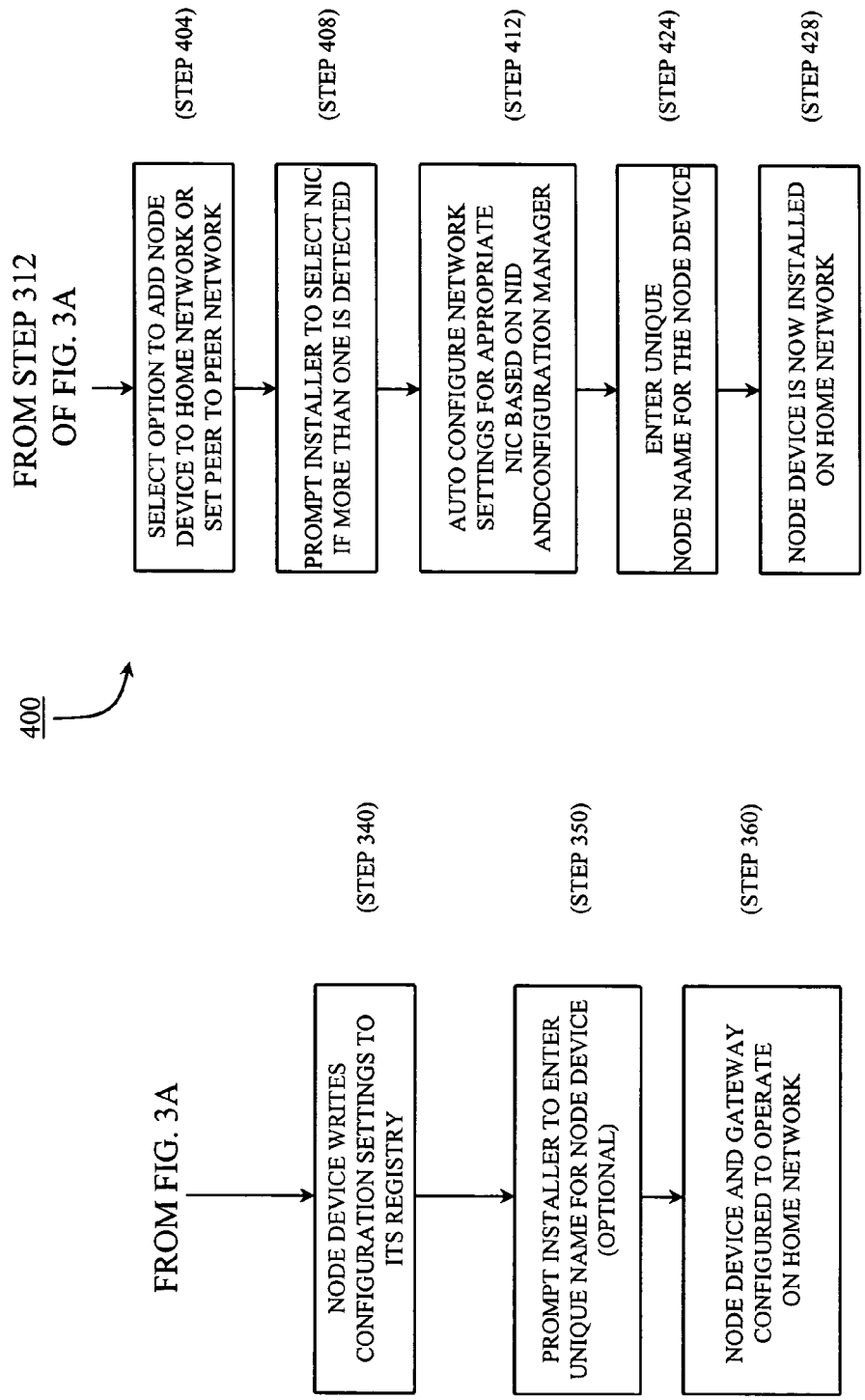

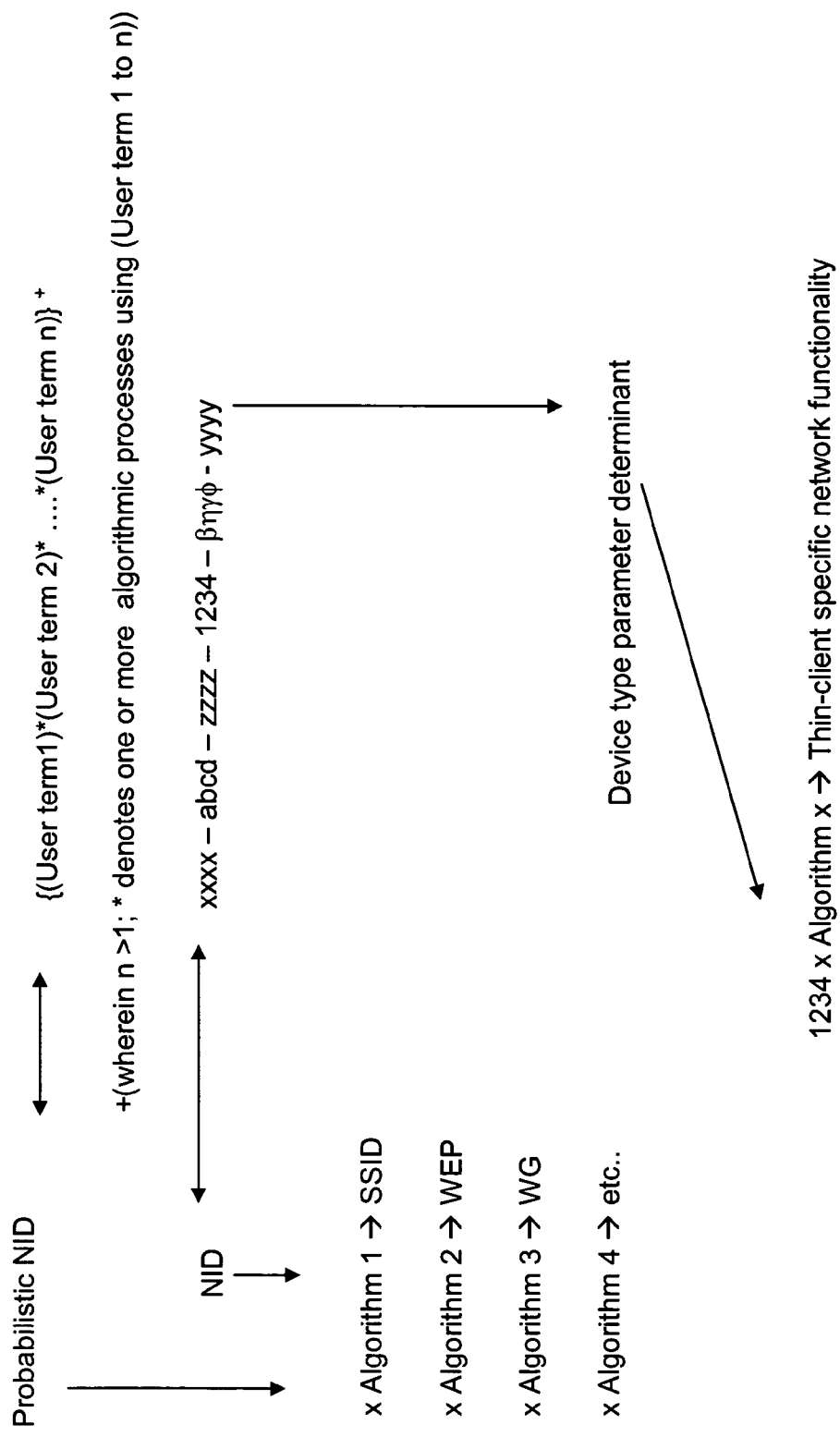

METHOD, SYSTEM AND DEVICE FOR AUTOMATICALLY CONFIGURING A COMMUNICATIONS NETWORK

CROSS REFERENCE TO RELATED DOCUMENTS

The present invention claims benefit of priority to U.S. Provisional Patent Application Ser. No. 60/436,381 of Vasisht, entitled "Home network in a box—a minimal installation and configuration solution to set up a home or SOHO network," filed Dec. 24, 2002, and U.S. Provisional Patent Application Ser. No. 60/457,625 of Vasisht, entitled "Home network in a box—a minimal installation and configuration solution to set up a small network comprising a few nodes, as in a home or SOHO network," filed Mar. 26, 2003, the entire disclosures of all which are hereby incorporated by reference herein.

BACKGROUND OF THE INVENTION

1. Field of the Invention

The present invention relates generally to networks, and more particularly to systems, devices, and methods for installing and configuring communications networks, such as home networks, Small Office Home Office (SOHO) networks, and the like.

2. Discussion of the Background

Small networks, such as home networks and Small Office Home Office (SOHO) networks, referred to generally as home networks, have a myriad of forms. Such home networks can include devices such as personal computers (PC), personal digital assistants or handheld PCs (PDA), computing tablets (Tablet PCs), audio and video devices, file and print servers, and various other devices under broad categories of thin clients and Internet appliances, including smart appliances such as white good appliances (e.g., refrigerator). One type of home network uses the processing power and flexibility related to general purpose computing platforms such as PCs that can run different applications on an operating system, such as Windows operating system by Microsoft Corporation. Other types of home networks are based on consumer electronics platforms such as set-top boxes and audio and video receivers, which are dedicated function devices with data processors and memory. Another type of home network is based on intelligent appliances, such as white good appliances, and generally intended for home automation.

Of the different types of devices that can appear in a home network, the PC is the most common networked device today. An increasing number of households have at least two PCs. Typically, one of the PCs is connected to the Internet or World Wide Web (www) through an Internet Service Provider (ISP) connection. Increasing numbers of users want all of the PCs in their home to connect simultaneously to the Internet by sharing the single ISP connection.

The different types of home networks will imminently converge, presenting challenges to the installing and configuring of a home network in which the various types of devices can communicate with each other and with the WAN and Internet. Various standards and interfaces have been or are being developed to enable home networking. Examples of these standards are: Home Audio/Video Interoperability (HAVi), Universal Plug and Play (UPnP™), Wireless Fidelity or WiFi, Bluetooth™, HomeRF, Home Phone Networking Alliance (HPNA), HomePlug, Ultra Wide Band (UWB), and Zigbee™.

Consumer electronics and appliance manufacturers have long considered home networks a significant opportunity to drive adoption of new products and services by the consumer. Currently, however, home networks are difficult to install, primarily on account of network settings that are required to network devices. Consequently, ordinary users of electronics appliances and computers are generally not home network users. To realize widespread adoption, the installation and configuration of home networks should be sufficiently simple to be carried out by lay users and with devices that are priced at mass market price points. This requires either that the users become technologically sophisticated overall, or that the home network technology advances sufficiently to require little or no expertise on the part of the user without significantly adding to the cost of the device.

Educating users to be technologically sophisticated is an intractable challenge. Even for PC users, who are generally more technically sophisticated than others, current home networking of PCs requires the user to follow instructions presented in a user guide and to configure the various network device(s) manually. For the typical user, this process is overly complex. For example, currently available routers for home networks typically require a strict setup procedure with numerous manually entered network settings that need replicating on other devices in the home network. However, a departure from, or error in, following the step-by-step instructions provided in the user guide can result in a failed attempt to set up the home network. Further, factory default settings on network devices are typically unsatisfactory for secure usage. For instance, manufacturers typically distribute their 802.11b equipped routers with the same default Service Set Identifier (SSID) setting on each device and with the Wireless Equivalent Privacy (WEP) security feature deactivated. Unless the user specifically changes these default settings on the router and on each node device on the network, where appropriate, the network is not secure. As a result, the typical user often finds such devices too difficult to install in a home network. Because routers (i.e., gateways) are often critical to enabling multiple PCs to share an Internet connection, many users do not advance beyond a broadband connection to the ISP using a single PC.

On the technical advancement front, an initiative such as HAVi, for example, which is based on IEEE 1394, has been taken towards producing a complete system architecture including a network protocol, device interfaces, device architecture, various network management systems and managers, and device classes. Although the HAVi initiative may achieve plug-and-play simplicity once a HAVi infrastructure is in place, HAVi requires a class of compliant devices, a suitable network architecture and wiring, and, because of such requirements, results in more expensive devices and requires a major change in consumer behavior. As a result, acceptance of HAVi has been slow and with negligible market penetration.

Generally, among existing products, in order to enable the router to access the Internet, the router requires configuring of ISP settings. The widely accepted method among existing available products is to access an HTML page user interface of a router from a PC using a manufacturer assigned router private IP address or URL, and entering the settings on the HTML pages served up by a web server in the router. In order to connect the router to the LAN, the router requires TCP/IP settings and LAN protocol settings, among others.

Some of the TCP/IP settings are: range of private IP addresses that the router issues to PCs; dynamic addressing using DHCP, or static IP addressing for node devices; and sharing a single public IP address using NAT. Some solutions use an application on a node device to enter the router settings that are then written to the router registry, thereby eliminating the need for writing to HTML pages on the router.

Common LAN protocol settings are required for network devices using a specific LAN protocol (e.g., 802.11b) to communicate with each other. In the case of a network using 802.11b, at minimum a Service Set Identifier (or SSID) is required on each 802.11b-equipped router. Additional 802.11b settings may also be required or strongly recommended, such as a common WEP encryption code on all suitable devices.

Recognizing the problems associated with complexity of setting up home networks, manufacturers of home networking products have made improvements to product features described hereunder in the context of configuring required networking parameters. Some examples of improvements to the description above have been incorporated recently in available routers, and described here. Routers are commonly defaulted with LAN NAT and DHCP settings as "ON", recognizing that most users use this configuration. For routers supporting WiFi, the SSID is defaulted to a standard factory default (e.g. Linksys routers have a default SSID of 'linksys'), and WEP is 'OFF' in order to enable the user to follow fewer steps to set up the network. Typically the WEP key is an ASCII or Hexadecimal (HEX) string. In order to simplify the entry of a WEP key, some manufacturers allow the user to enter a password or pass phrase that then generates an ASCII or HEX WEP key.

In the instance where ISPs do not require authentication other than the MAC address of the modem, the router can be just plugged into the modem and it connects to the Internet without much user setup of ISP settings. However, when this is not the case, user configuration of the router with ISP settings is required.

Some of the problems that still exist in current routers despite the above improvements are: In setting up the router, the user has to know whether the ISP requires settings other than modem's MAC address to authenticate the user. If so, the user has to configure the router accordingly with settings obtained from the ISP, or settings obtained from the device connected to the ISP. Whereas the SSID may be defaulted in the router, the user still has to acknowledge and enter the same SSID on the node devices (e.g., PCs). Further since routers from the manufacturer are defaulted to the same SSID, the user is advised to change the SSID manually to ensure privacy of her network. In addition, users should use WEP at minimum to secure their network from snooping, since SSID is not secure. Defaulting to WEP "OFF" is therefore well recognized as a fundamental flaw in current solutions. In order to turn WEP (or another form of encryption such as WPA) "ON" requires the user to enter an encryption code or 'pass phrase' on the router, and the same code on the PCs.

Among current node devices, such as PCs, configuration of the device for networking is usually accompanied with installation of the network interface card (NIC). Different manufacturers adopt different approaches for the various required settings. While some manufacturers only facilitate the installation of the NIC and set up of the network protocol parameters, others enable additional network features such as file and print sharing, and setup of Workgroup Names for Windows, among others. However, the common thread across the various products is that is that users are required to enter settings on at least one node device for the multiple different parameters required, and some or all of these settings are also required to be input to the router or other node devices by the same or another means. This also introduces room for pilot error in case the user makes a typographical error, which will result in a non-networked device.

Improvements in configuring node devices for networking include, in the Windows XP operating system, introduction by Microsoft of a Zero Configuration Utility for WiFi that gives users a list of available WiFi networks. If the networks are broadcasting their SSID and do not have encryption, the user can log on to the network by simply accepting a network in the Zero Configuration Utility interface. However, should the network require authentication or an encryption key, the user has to enter this information. Consequently, Microsoft's Zero Configuration Utility for WiFi in Windows XP reduces the steps for configuring a WiFi NIC in some instances, but not always. Microsoft's configuration utility supplied with its line of WiFi home networking adapters (e.g., Model: MN 520 PC card) provides a feature to enable a user to backup or copy on floppy network entries made on a PC. This permits ease of transfer of network settings to other node devices, thereby minimizing repeated manual entries of the required setting on subsequent network PCs.

While these features in network configuration of node devices have improved the user experience, there is still complexities and room for user error. For example, with the above mentioned methods, the user still needs to create the settings on at least one PC, in addition to setting up the router with the required settings. The user, therefore, needs to be cognizant of required parameters and settings. This in itself is asking too much of a lay user. Using factory default settings as network settings can cause the user to have security problems that the user may not be aware of. In addition, with reference to Microsoft's solution of transferring network settings among devices, in many laptop PCs, floppy drives do not exist, or are swappable with CD/DVD drives, thereby precluding the benefit of the feature.

Consequently, none of the above-stated requirements for home networks is realized yet, and the adoption of home networks, although growing, remains low. Thus, there is a need for a system and method for installing and configuring networking parameters for a small network, as in single subnet or single router network, that avoids the pitfalls and disadvantages of the aforementioned approaches to home network configuration that rely on users' abilities to understand different networking parameters and their correct usage, as well as elimination of user error in configuring the same.

In recent art, network management tools for large (e.g., enterprise and commercial) networks rely on principles of distributed computing in order to simplify the configuration and management of such networks. Such network management tools use network objects, profiles and directories (hereafter, groupings) that are usually manually created and managed by network administrators. The grouping of network users or network parameters and settings are created with unique nomenclature. These grouping simplify cataloging, retrieving, transferring and processing of such information, in general applying the principles of distributed computing and network objects. The groupings are therefore abstractions of network parameters and profiles that are used to group the same into a logical structure for network management purposes. They are relevant to large and complex networks, and are dependent on technical skills of network administrators for configuring and managing the networks, and are usually based on a client-server network configuration. This approach of server based network objects is inappropriate for small networks, such as home networks.

It can also be argued that current home networks rely on rich user interfaces, such as a complex graphical user interface (GUI) of a PC. Evidently, devices lacking such an elaborate user interface are not good candidates for networking. Nevertheless, many devices can benefit from networking despite not having such user interfaces.

SUMMARY OF THE INVENTION

Therefore, there is a need for a system and method that overcome the above and other problems with the above-noted methods and systems. The above and other needs are addressed by the exemplary embodiments of the present invention, which provide a system and method for automatically configuring devices in a communications network, such as a home network, a Small Office Home Office (SOHO) network, and the like, with minimal user input or networking expertise.

Accordingly, in exemplary aspects of the present invention, a system, method, device, and computer program product for configuring a communications network for a user are provided. The system, method, device, and computer program product include assigning a network identifier to a communications network of a user, the network identifier being unique to an instantiation of the communications network; and automatically generating a plurality of unique network configuration settings for one or more network devices of the communications network based on the network identifier.

Still other aspects, features, and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which:

FIG. 3A and FIG. 3B are flow diagrams illustrating an exemplary embodiment of a process of transforming the configuration of FIG. 1 into the home network of FIG. 2 in accordance with the principles of the exemplary embodiments;

FIG. 4 is a flow diagram of an exemplary embodiment of a process for installing an additional device and configuring that device for the home network of FIG. 2;

FIG. 7 is a diagrammatic exemplary representation of how the NID and SID is used to generate different networking parameters.

DETAILED DESCRIPTION OF THE PREFERRED EMBODIMENTS

In brief overview, the exemplary embodiments include a method, device, and network system specification that enables a lay-user to configure, troubleshoot, and maintain a small network, such as a single subnet TCP/IP network, or a single router network. The type of network referred to here is typically used for a home network, a Small Office Home Office (SOHO) network, and small enterprise network applications (i.e., local area networks or LANs), hereafter generally referred to as a "home network". Configuration, as used herein, means that each device that is part of the home network receives settings (i.e., values) for certain parameters that enable the device to operate on the home network (e.g., to share a broadband connection to an Internet Service Provider (ISP), to communicate with peripherals, and to communicate with other devices on the home network). Such settings are referred to broadly as configuration settings and such parameters as configuration parameters. The following description makes particular reference to personal computers (PCs) and Transport Protocol/Internet Protocol (TCP/IP)-based networks to illustrate the exemplary embodiments. Notwithstanding, the principles of the exemplary embodiments apply to other types of network devices and networks. The exemplary embodiments can be applied to WAN connectivity for other than Internet and World Wide Web; services other than Internet access over a WAN connection; wherein the service provider is one other than an ISP; such as video and audio delivery over digital cable service using hybrid-fiber coaxial cabling (HFC), wherein the service provider is a cable service provider. Further, although the exemplary embodiments has practical application in small networks that have a connection to a Wide Area Network (WAN), the exemplary embodiments can also be used to configure and maintain networks not having WAN (e.g., Internet) connectivity, or a star configuration with a central gateway, router or hub (the terms 'router' and 'gateway' are used interchangeably herein). Examples of such non-gateway centric networks are peer-to-peer networks; and ad-hoc or promiscuous networks within a home, SOHO, small enterprise, or temporary conference areas and other temporary public networks.

Figure 1:
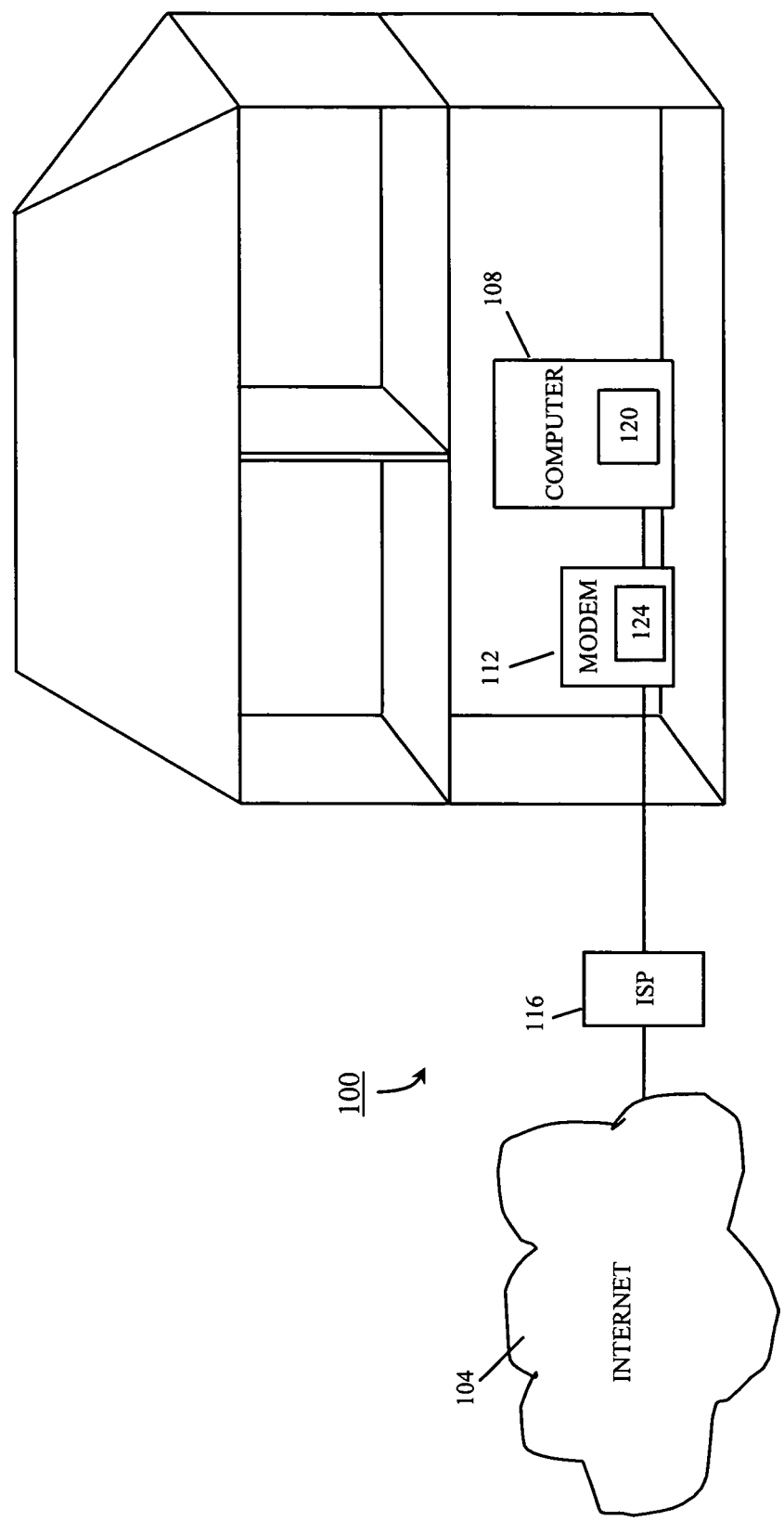
FIG. 1 is an block diagram of an exemplary computer system connected to the Internet through a modem.

FIG. 1 shows an exemplary embodiment of a typical Internet connection 100 between a typical broadband Internet subscriber and the Internet 104. The Internet connection 100 includes a computing device 108 (e.g., a PC), a modem 112, and an ISP 116. In general, the ISP 116 is a business that provides connectivity services to the Internet 104 to individuals, businesses, and organizations. The computing device 108 is connected to the modem 112 through, for example, a wired Ethernet RJ45 or Universal Serial Bus (USB) connection. In general, the computing device 108 is a processor-based device with memory 120 for storing data. The modem 112 is connected to the ISP 116 over a wired or wireless connection, and has memory 124 for storing data. The type of modem depends upon the type of connection with the ISP 116 (e.g., a dial up, T1, cable, xDSL, ISDN).

To communicate with the ISP 116, for purposes of authentication by the ISP 116 or to connect to a service of the ISP 116, the computing device 108, modem 112, or both (generally referred to as CPE hereafter) store configuration parameters in their respective memories 120, 124, or the ISP authenticates using CPE parameters such as MAC address(es), or by the user entering authentication parameters (if they are not stored in memory, as in the case of PPP dial-up Internet access). In addition to the requirements a specific ISP 116 may pose, these parameters and their settings also depend on the type of access technology used (e.g., ISDN, Digital Subscriber Line (DSL), Hybrid-Fiber Coax (HFC), PPP dial-up). For illustration purposes, the description of the exemplary embodiments herein focuses primarily on using Dynamic Host Configuration Protocol (DHCP) connection to the ISP. It is to be understood, however, that the principles of the exemplary embodiments are not limited to this type of ISP service, but also apply to other types of access. Examples of parameters employed for the computing device 108 to communicate with the DHCP-based ISP 116 can include a Host ID, one or more Media Access Control (MAC) addresses, a Domain Name System (DNS) Server IP address, a Node Type identifier, an Internet Protocol (IP) address, a Subnet Mask, a Default Gateway IP address, and a DHCP Server IP address. The above described parameters and their settings for communicating with the ISP 116 are hereafter referred to as ISP or WAN parameters and ISP or WAN settings, respectively. Parameters and settings broadly referred to as network parameters, network configuration settings, network configuration parameters, network settings, relate to the home network.

To authenticate a user, the ISP 116 requires a Host ID, one or more MAC address, or both. The MAC address can belong to one or both of the computing device 108 and modem 112. When authenticated, a DHCP server of the ISP 116 automatically sends to the computing device 108 the other parameters, such as the DNS Server(s) and Subnet Mask parameters. The ISP 116 authenticates a user using the ISP parameters and settings for the computing device 108, the modem 112, or both.

In other embodiments of Internet connections, the computing device 108 uses different access technology and, consequently, different parameters to communicate with the ISP 116. For example, when the access technology of the ISP 116 is PPPoE on an Asynchronous Digital Subscriber Line (ADSL) connection, the ISP 116 performs authentication using a User Name and Password established by the ISP 116 for a user account.

Figure 2:
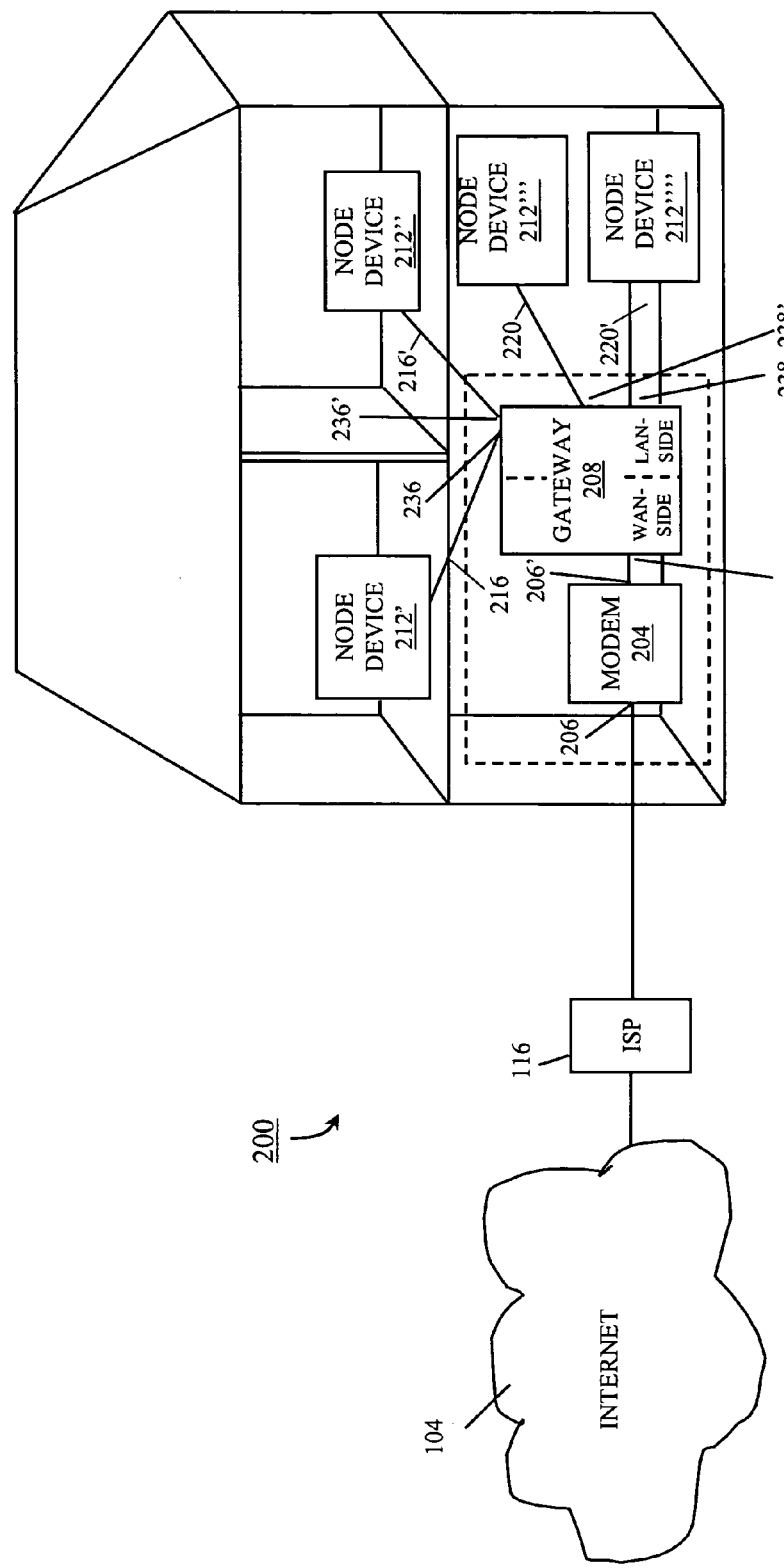
FIG. 2 is a block diagram of a local area network (LAN) constructed in accordance with the principles of the exemplary embodiments and connected to a wide area network (WAN)

FIG. 2 shows one exemplary embodiment of a local area network or LAN (hereafter, home network) 200 embodying the principles of the exemplary embodiments. The home network 200 includes a modem 204, a gateway device 208 having a WAN-side and a LAN-side connectivity, and a plurality of node devices 212', 212", 212''', and 212'''' (generally, node device 212) on the LAN side. The gateway device 208 and node devices 212 are broadly referred to as network devices. In another embodiment, for peer-to-peer wireless or wired networks that do not have an Internet connection, the modem 204 and the gateway device 208 (hereafter, gateway 208) are absent.

The modem 204 is in communication with the ISP 116 of FIG. 1, which provides a connection to the Internet 104. The connection with the ISP 116 can be by one of a variety of wired or wireless connections, based on one or more of a variety of standards based or proprietary communication schemes and protocols. Examples of this are T1 lines, twisted pair for dial up or DSL, HFC or 'cable', Motorola's proprietary Canopy fixed wireless, emerging IEEE 802.16 standard implementations for fixed wireless, among others.

In general, each network device comprising node devices 212 and gateway devices 208 has a processor and memory that is capable of running software code or programs. Examples of node devices 212 include, but are not limited to, computing devices such as personal computers (PCs); tablet PCs and handheld PDAs; consumer electronics' devices such as audio and video receivers; white goods' home appliances, such as refrigerators, washing machines, coffee machines and electric toaster ovens; game consoles such as Microsoft's X-Box, Sony Corp's Game Cube, and Nintendo's Play Station series game consoles; dedicated systems such as security systems with sensors, alarms and controllers; home automation systems with sensors and controllers; other thin Internet appliances such as dedicated email clients, or web browser clients.

The user interface displayed at each network device 212 and 208 can be a text driven command line interface (e.g., the DOS operating system manufactured by Microsoft Corporation of Redmond, Wash.); or graphically driven interface (e.g., the WINDOWS operating system manufactured by Microsoft Corporation of Redmond, Wash., or HTML pages using a web browser); or dials, keypad, or touch panel based controllers including IR and RF remote controls; or microphone based voice controllers; among others. Advantageously, the exemplary embodiments mitigate device design requirements by minimizing user interface requirements on network devices.

The operating system of each network device 212 can be one of a variety of platforms including, but not limited to, operating systems from Microsoft Corporation, Sun Microsystems, Apple, Wind River Corporation, Symbian, Palm, and open source operating systems such as Linux, and other proprietary operating systems.

Each network device 212 and 208 may also have one or more Network Interface Cards (or NIC) with appropriate drivers for the particular LAN media protocol supported by the network device 212 and 208 (e.g., 10/100 Base T Ethernet; 802.11a, b, or g; HPNA; Zigbee™; and HomePlug; UWB; among others). Devices using the same LAN protocol require compatible settings in order to effectively network with each other.

For illustration purposes, the exemplary embodiments herein focus primarily on node devices comprising personal computers (PCs) running Microsoft Windows 98SE or later operating systems (e.g., 2000, ME, XP), using TCP/IP networking with different Media Access Control technologies and LAN protocols, as described (e.g., Ethernet, 802.11).

Each connection between the gateway 208 and node device 212 is wireless or wired. In one embodiment, the node device 212' and node device 212" are connected to the gateway 208 through a respective wired Ethernet RJ45 connection 216, 216', and the other node devices 212''', 212'''' are connected to the gateway 208 over a respective wireless connection 220, 220'. The wireless connections in one embodiment are established using the IEEE 802.11b protocol utilizing the Wireless Equivalent Privacy (WEP) security feature. This particular combination of wired and wireless connections is for illustration purposes only. The home network 200 can be entirely wireless, entirely wired, or have any suitable combination of wired and wireless connections, and with a plurality of wired protocols, wireless protocols, or combination thereof in simultaneous use, without departing from the principles of the exemplary embodiments.

The modem 204 includes a first physical data port (e.g., an RJ45 Ethernet port) 206, for connection to the gateway 208, and at least a second physical data port (referred to as a WAN port) 206' for connection to the ISP 116. This Internet connection to the ISP 116 is a wired or wireless connection, depending upon the technology by which the connection is established, such as Hybrid Fiber-Coax (HFC), or twisted pair copper wire. Depending upon the type of connection with the ISP 116, the modem 204 can be one of dial up, cable, xDSL, or ISDN, among others.

The connection between the modem 204 and the gateway 208 is over a wired or wire-equivalent connection (e.g., an Ethernet RJ45 connection, or wireless using Bluetooth or IR). In one embodiment (shown in phantom), the modem 204 is integrated with the gateway 208. For this embodiment, the connection between the modem 204 and gateway 208 occurs over a data bus on a single chassis device, wherein both devices are embodied in one case; over printed circuit board (PCB) line traces, wherein both devices are embodied on a single PCB; or on an integrated piece of silicon, wherein both devices are embodied on a single integrated circuit (IC).

In the home network 200, the gateway 208 is, in general, a network device that interfaces between a WAN and a LAN and enables sharing a connection to the WAN among devices connected to the LAN (which are the node devices 212). The WAN connection can be to the Internet and World Wide Web (www), or to a cable television network, or another service that may or may not use the Internet, or a combination of different services using different WAN networks. In the illustrated exemplary embodiment, the gateway 208 enables sharing a broadband connection to the Internet 104 through the ISP 116. Also enabled by the gateway 208 is routing among the node devices 212, for example, to share data, files, applications, and peripherals. The gateway also enables bridging and switching across various protocols such as Ethernet, 802.11b, HomePlug, among others. The gateway may offer storage for content, and applications that enable distribution of this content on the home network, among other features of the exemplary embodiments.

Gateway devices can be embodied on platforms including PCs, set-top boxes, cable/DSL modems, in addition to stand alone gateway devices. In one embodiment, the gateway 208 is standalone, such as the Model MN 500 Wireless Base Station produced by Microsoft Corporation, or the BEFW11S4 model produced by Linksys. In another embodiment, the gateway is integrated with a cable modem, as in Motorola's model SBG1000 product. The gateway 208 includes a processor and memory (not shown), at least one WAN-side physical data port 232 for communicating with the WAN (e.g., the Internet 104), a plurality of LAN-side physical data ports 236, 236' for wired communication with respective node devices 212' and 212", and a plurality of LAN-side physical data ports 238, 238' for wireless communication with respective node devices 212''' and 212"". Gateways are likely to include routing capability for routing protocols, (e.g., NAT functionality, a DHCP server for TCP/IP networking on the LAN); and bridging or switching functionality across the various LAN protocols supported by the gateway. In general, LAN technologies supportable by the gateway 208 include, but are not limited to, one or more of the following: Ethernet, Home Phone Networking Alliance (HPNA), HomeRF, Bluetooth™, power line networking (e.g., HomePlug), Universal Plug and Play (UPnP™), Wireless Fidelity (WiFi), Ultra Wide Band (UWB), and Home Audio/Video Interoperability (HAVi) or IEEE 1394. WAN connections supportable by the gateway 208 include, but are not limited to, one or more of the following: Ethernet, HFC, xDSL, ISDN, and USB.

In one embodiment, the WAN-side physical data port 232 and LAN-side physical data ports 236, 236' are RJ-45 10/100 BaseT Ethernet, and RJ-45 Ethernet connections connect the gateway 208 to the modem 204 (on the WAN-side), and to each of the node devices 212', 212" (on the LAN-side). The LAN-side physical data ports 238, 238' are Wi-Fi, or 802.11, ports for establishing a wireless connection with each of the respective node devices 212''', 212"" (on the LAN-side). In the embodiment shown in FIG. 2, the gateway 208 bridges across different LAN technologies such as Ethernet (for wired connections) and 802.11b (for wireless connections).

In order to communicate on the home network 200 as desired, network devices 212 and 208 are configured with settings for one or more of the following types of parameters per definitions earlier: 1) ISP-parameters; 2) network parameters for TCP/IP; 3) network parameters for LAN protocols; 4) network parameters for operating-system networking.

To communicate with the ISP 116 over the WAN-side connection, and, thus, to access the Internet 104, the gateway 208 is configured with ISP settings. Such ISP settings can include none or some of the following parameters: the Host Name (or Host ID), one or more MAC addresses, one or more IP addresses, Login Name, and Password. The ISP 116 uses these settings to authenticate the customer premises equipment (CPE).

To connect to the node devices 212, the gateway 208 requires LAN network settings for TCP/IP, and for LAN protocols. In the current exemplary embodiment, the TCP/IP settings that the gateway generates, or passes through from the ISP to the node device include, DNS Server address(es), Default-Gateway IP-address of the gateway for the LAN; Subnet Mask for LAN; private IP address for the node devices issued from a pool of private IP addresses issued by the DHCP server of the gateway 208 to node devices 212 in the home network 200; Other settings on the gateway may require, among others—setting the gateway's DHCP server ON or OFF; perform network address translation (NAT) or not, for determining whether a single public IP address is shared among the node devices 212; non-TCP/IP networking parameters that the gateway adheres to include, for example, LAN protocol settings SSID and WEP encryption key for 802.11 wireless networks; Workgroup name for Windows networking.

In the current exemplary embodiment, the gateway 208 is configured as DHCP server for LAN and NAT is set "ON" so that the gateway 208 functions as a DHCP server for the node devices 212 on the LAN. In this embodiment, the DHCP server of the gateway 208 provides LAN TCP/IP network parameters, such as private IP addresses, the gateway's Default Gateway IP address, and Subnet Mask for the LAN to the node devices 212. It passes through the public DNS Server IP address from the ISP to the node devices. LAN protocol settings depend upon the protocol being deployed for the LAN (e.g., Ethernet, 802.11b, and HomePlug). In the one embodiment where network nodes use 802.11b protocol, the gateway 208 shares the same SSID and WEP encryption key set on the node devices for 802.11b.

For the node devices 212 to be able to communicate with the gateway 208, other network settings referred to as network modes, are configured to be compatible across the various network devices. For example, in an embodiment in which the gateway 208 is configured with the DHCP server, in general, the node devices 212 are configured as DHCP clients to receive IP addresses from the DHCP server.

Some node devices 212 have networking parameters specific to the operating system being used. For example, in the exemplary embodiment wherein the node device 212 is PC-based system running Microsoft Windows 9x or later, in addition to the TCP/IP and LAN protocol parameters discussed above, the node device 212 requires Windows Networking parameters, such as PC Name and Workgroup Name. In addition the node devices may require functional settings such as file and print sharing settings for the NIC in order to realize the usefulness of the device on the network.

Some of these operating system network settings can also be employed to populate registry settings on the gateway running the same or another operating system, if the gateway bridges the operating system specific networking protocol (e.g. NetBEUI for Windows")

Further, some applications (e.g., third-party programs) that run on the node devices 212 require session-specific settings on the gateway 208, such as opening of specific IP ports on the NAT of the gateway while running a particular application program on the node device. The NetMeeting video conferencing application, distributed by Microsoft Corporation of Redmond, Wash. is an example. To run NetMeeting, the manufacturer of the application specifies specific numbered IP ports be available to the application for access to the WAN. Examples of other applications for which specific numbered IP ports are to be opened on the gateway's NAT are video gaming, web servers, and FTP servers, among others.

Figure 3A:
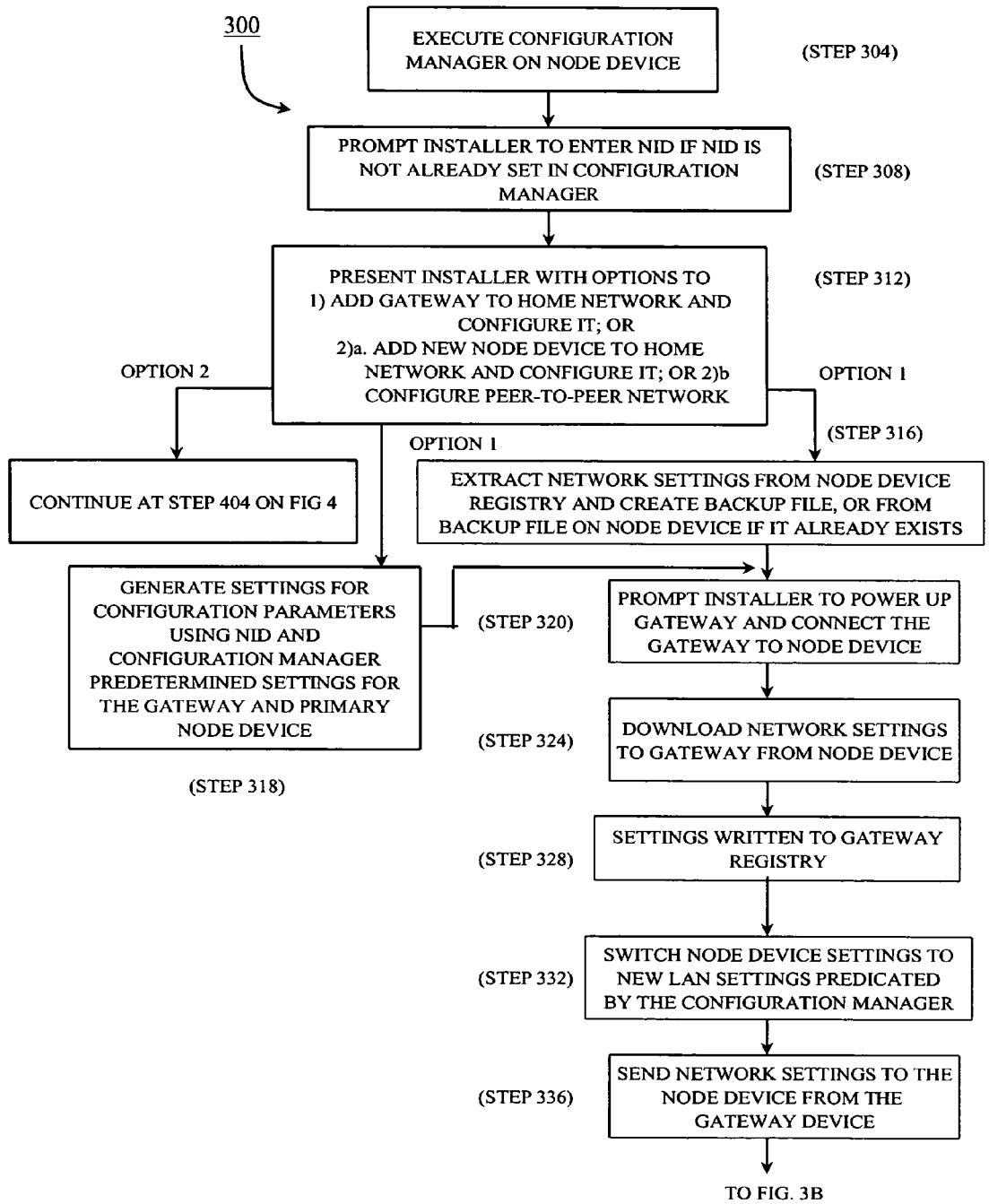

FIG. 3A and FIG. 3B show an exemplary embodiment of a process 300 for configuring a home network, as exemplified in FIG. 2, in accordance with the principles of the exemplary embodiments. One objective for building a home network is to share a WAN service connection, such as a broadband Internet connection among node devices within the home. Another objective is to have devices with compatible network configuration parameters to be able to exchange data and share resources. The process 300 of the exemplary embodiments alleviates problems experienced by typical users when progressing from the single broadband connection exemplified in FIG. 1 to a home network exemplified in FIG. 2.

In general, the process 300 builds a home network, as exemplified in FIG. 2, from a previously established broadband connection, as exemplified in FIG. 1, between the ISP 116, modem 204 and, as a representative example, the node device 212' (referred to hereafter as the primary node device 212'). As a result of the previously established broadband connection with the ISP 116, the primary node device 212' has received ISP and network settings for various parameters described above, and the ISP 116 has registered either a host name assigned to the primary node device 212', or the MAC address of the primary node device 212', or modem 204, or both for authentication. Alternatively, the ISP 116 uses both host name and MAC address for authentication. DHCP addressing by the ISP 116 is common to conserve public IP address usage. The DHCP server of the ISP 116 sends the network settings to the primary node device 212' in its original configuration without a home network for the following network parameters: DNS server IP addresses, Default Gateway IP address, and Subnet Mask. These network settings are sent as a function of DHCP and stored at the primary node device 212' when the ISP 116 authenticates the user of the primary node device 212'. As described above, the particular ISP and network parameters and their settings vary based on the access technology, and the principles of the exemplary embodiments apply also to such other technologies and their respective ISP and network parameters.

Based on the exemplary embodiments, each network device 212 and 208 is capable of executing a software program, hereafter referred to as a "configuration manager," wherein each device or device type can have its own embodiment of the configuration manager. The configuration manager configures the network device either independently, by interacting with another device and its configuration manager, or by formatting settings and commands to interact with legacy third party devices through their existing interfaces. In one embodiment, the gateway 208 receives configuration settings from a primary node device, wherein the configuration manager on the node device generates settings employed by the gateway. The configuration manager on the gateway then uses the settings to configure the gateway for operation on the WAN and LAN. In other embodiments, the gateway receives settings from the ISP over the WAN, and sends settings to node devices. In yet another embodiment, the gateway receives manually input settings.

In general, the configuration manager includes a set of one or more algorithms for automatically generating settings for various network configuration parameters, an automated sequence of steps, user prompts, and the like, employed to configure and operate the network devices on the home network 200, such that the objective of minimal technical involvement of the user in setting up the network is met. The one or more algorithms can include any suitable equation that can generate the network configuration parameters, for example, based on a unique "Network Identifier" (hereafter, NID).

The configuration manager generates one or more of these settings based on the NID, which for example, includes a set of characters uniquely assigned to the specific instantiation of the network. The use of this NID to generate network settings asserts that no two LANs or home networks have the same NID intentionally, and thus the automatically generated network configuration settings for the home network are unique to the extent necessary to keep such networks distinct and secure from one another. While the use of NID generates multiple network settings, for example, from a single input, thereby minimizing the user inputs required, it also shields the user from being exposed to different network parameters and complex installation procedures for the setting of such parameters.

The NID as described above fundamentally addresses the requirement of unique network settings for each network, and is uniquely assigned to the instantiation of the network as described in detail below. Nevertheless, probabilistic NIDs as explained hereunder can in practicality also adequately meet the needs for security, privacy and ease of use that the exemplary embodiments enable. Such probabilistic NIDs ideally apply two or more user generated inputs to generate the settings. The likelihood that two networks would use the same two or more inputs and be within geographical proximity such that the networks would interfere is probabilistically remote, especially when the users deliberately choose inputs that are not obvious or common. Examples of such inputs, wherein an NID is algorithmically generated using two user-defined inputs, would be 1) a user-defined User Name, and 2) a user-defined Password; or a user defined phrase with two or more words. In one embodiment, the combination of these two terms would be applied to algorithmically and repeatedly generate an NID that would be unique to the combination of these terms, and the NID so generated in turn is applied to generate the settings for network parameters of the exemplary embodiments. The user would then input in different network devices these two inputs instead of the NID as defined. For the purpose of simplicity in description of the exemplary embodiments, references to NID can include the probabilistic NID just described, wherein the actual user inputs can be two or more user defined terms.

Figures 6A, 6B:
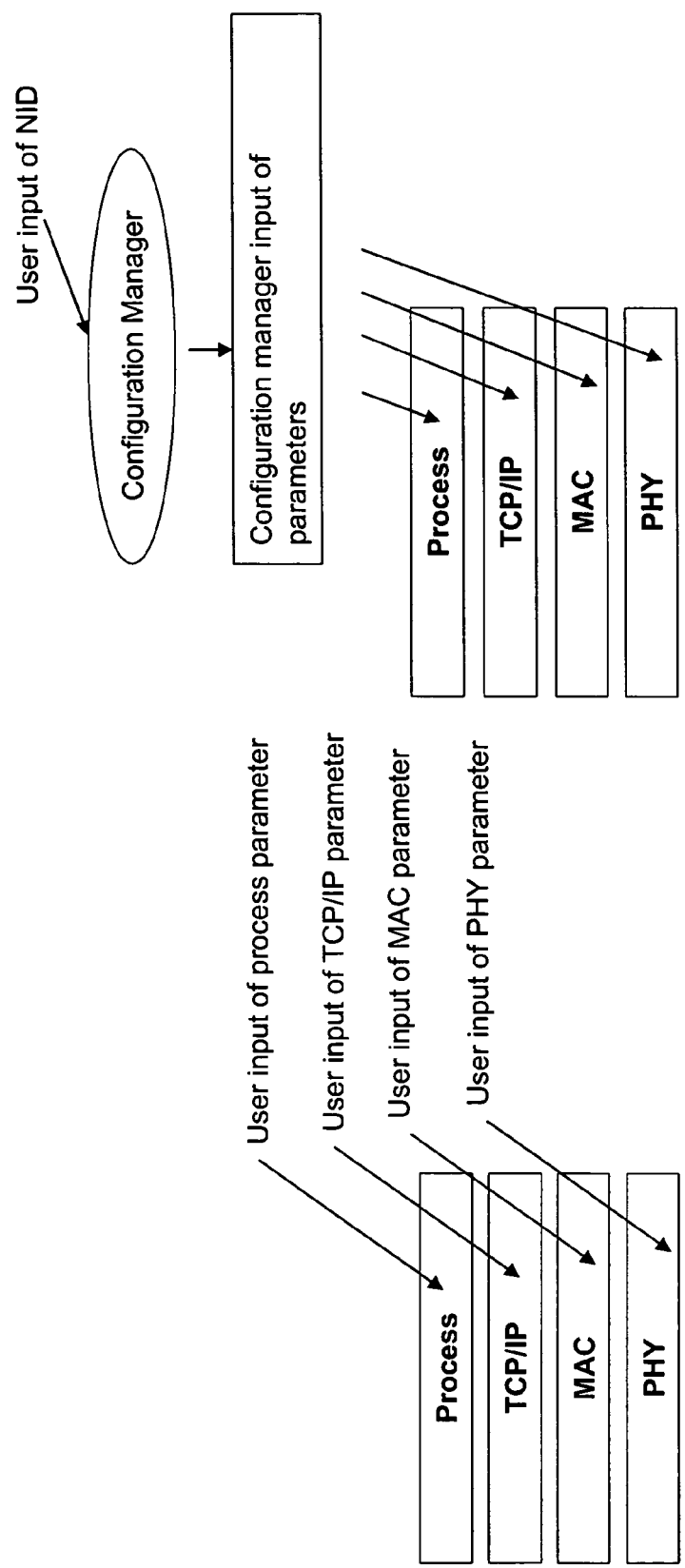
FIG. 6 is a diagrammatic representation of implementation of NID in setting exemplary network parameters as compared to traditional approaches for the same.

FIG. 6 illustrates the use of NID in an exemplary TCP/IP network embodiment. FIG. 6a and FIG. 6b represent the traditional approach and the approach taken by the exemplary embodiments, respectively, to input settings for different network parameters across the network stack. (The generic network stack shown is compressed for the purpose of the explanation). Wherein, FIG. 6a illustrates the typical implementation of the network parameters over the network stack, such that TCP/IP, LAN protocol (MAC and PHY), and other settings are input manually. FIG. 6b illustrates the approach taken by the exemplary embodiments using the NID applied to the configuration manager, which in turn generates the settings for the plurality of parameters, and applies the same to the network device, thereby eliminating the need for users to input settings for the different parameters.

In addition to defining specific values for network parameters, the NID can also be used to define other network attributes, such as network architecture attributes (e.g., to configure an 802.11 network in Infrastructure mode with DHCP addressing for the LAN); or network size (e.g., the number of node devices that a network can accept by controlling the pool of DHCP addresses or the subnet mask); among others. These attributes are not unique to the network, but are in effect network parameters that are determined by the NID.

Effectively, the NID represents the network attributes comprising network parameters and settings in a single character set, wherein the network attributes are implemented using a configuration manager configured to interpret the NID. This NID association of the home network, advantageously, overcomes the above and other problems in making home networks easy to install and secure for lay users. The exemplary embodiments further illustrate how the NID and configuration manager together create a device and network solution to alleviate limitations of current devices and networks.

FIG. 7 illustrates the implementation of NID by the configuration manager, wherein the configuration manager algorithmically generates the different network parameter values. The implementation of SID is also shown, with an SID embedded within the NID, and wherein the SID is later described herein. The association of the NID to a home network instantiation, according to the exemplary embodiments, ensures that unique home networks are set up in terms of access and security. Algorithms use the NID to generate the said unique settings. Algorithms produce settings for different parameters. Generation of such parameter settings is repeatable, that is, an algorithm using a particular NID for generating a setting for a particular parameter produces the same value for that setting in accordance with the requirement for that setting (e.g. 26 HEX digits for 128 bit WEP encryption) each time that algorithm uses a specific NID, and a different value of the setting is obtained with a different NID. The algorithms and NIDs are configured to provide error protection for user manipulation of NIDs or erroneous NID entry into a node device. Other network parameters can also be associated with the home network based on the NID, as described below.

The configuration manger, through the attributes of the NID implements the exemplary architecture for interconnection of network devices, and can be applied to one or more devices in the method of the exemplary embodiments. In addition to generating settings for parameters, the configuration manager also executes a sequence of predetermined commands (e.g., through an installation wizard) in order to achieve the desired device and network configuration with minimal user inputs.

In some embodiments, the configuration manager also uses the NID to limit or define the functionality of the home network, of one or more node devices 212 on the home network, or combinations thereof. Consider, for example, that the NID determines the size of the home network (i.e. the allowable number of node devices) by regulating the size of the DHCP address pool that the gateway's DHCP server can issue for a specific NID. In this instance, while the range of IP addresses is not unique to the network, the same are, in effect, network settings determined by the NID. The NID specifies the range, and therefore, the number of IP addresses allowed on the LAN. Alternatively, the same objective can be accomplished by the NID dictating the subnet mask to control the size of the network. If additional functionality is needed (e.g., an increase in network size), the user requires another NID to be used by the configuration manager. In another embodiment, the NID prevents certain device types from being networked on a network employing the NID.

To manage NIDs and their associated functionality, the NIDs can be defined or organized in groups or tiers. NIDs in a particular group or on a particular tier determine the subset of features activated on a home network. Additionally, a given NID can also have one or more subordinate IDs (SID). An SID can include an extension or subset of characters on the NID. While the configuration manager for some device types do not recognize and use the SID, other device types use the SID to further control the functionality of the devices on the network. Some device types can use only the SID to configure themselves on the network. In essence, the NID can be a composite of multiple SIDs, in effect, allowing different types of networks to coexist on the same network or physical media. Consequently, certain devices can be controlled by different rules on the same network (e.g., quality of service available to a particular node device; or types of services that can or cannot be utilized by a particular node device; or interrupts on the network or overrides that can be generated by a particular type of node device—e.g. fire or burglar alarm—in an emergency).

In one embodiment, the NID is entered manually while running the configuration manager. In another embodiment, the NID is programmed into the configuration manager to run automatically, or through another form of invocation by the user, such as through a keypad switch. In yet another embodiment, the NID is obtained from another network device on the home network by polling or through a connection between devices, such as a serial link cable or a network connection. In yet another embodiment, the NID can be entered manually and then stored in the configuration manager, for example, on a transferable media (e.g., CD RW), for automatically implementing the NID based features without the user having to input the NID each time the configuration manager is invoked on the same or subsequent devices.

In another embodiment, the NID can be transferred from one network device to another, for example, from the primary node device 212' to the gateway 208 over an Ethernet LAN connection, from the ISP 116 to the gateway 208, or from the gateway 208 to the ISP 116 over a WAN-side connection, using for example, SNMP wherein the NID is embodied as an SNMP MIB. In an embodiment wherein the NID is transferred to the gateway over a WAN by the ISP, the gateway is used to impart the NID or NID based settings to one or more node devices on the home network, thereby enabling a service provider to control and facilitate the configuration of the home network.

In another embodiment, the NID can be an existing network or device parameter that meets the unique requirements of an NID, in that it is unique to the network or customer. Examples of such a unique identifier include, the serial number or MAC address of the router, the customer registration number assigned by a device vendor or service provider, a Host ID issued by an ISP to a customer, and the like. In one embodiment, a router can be defaulted to generate network settings upon initial power up using its MAC address as the network identifier.

The configuration manager can be embodied in one or more of a variety of read-write or read-only software media (e.g., a CD or DVD-ROM/R/RW, compact flash media, removable floppy disc, internal hard drive, EEPROM, ROM, among others). The network devices 212 and 208 access the configuration manager through a drive running such media as a CD/DVD ROM; or the configuration manager can be resident on the device in the form of an internal storage media such as a hard drive or EEPROM; or through an interface with another device, such as a serial link, or a network interface such as Ethernet.

The user can invoke execution of the configuration manager using any suitable user interface, such as a variety of the user interfaces described earlier. The configuration manager also can be configured to auto run, wherein the user can interface with the configuration manager using any suitable user interface, such as a variety of the user interfaces described earlier.

Network devices, including the gateway, can be configured to utilize the unique benefits of the configuration manager as described herein. This does not obviate or eliminate the possibility that in other embodiments the configuration manager is adapted to enable existing third party devices to benefit from the exemplary embodiments. In one embodiment the configuration manager on one device generates and formats the settings to an existing interface on another existing third party device, and transmits the settings in the said format. For example, the device models Linksys Model BEFW11S4, and Microsoft Model MN500 Wireless Base Station utilize an HTML user interface, settings for which can be encoded in an HTTP stream from another device and automatically populated in the registry of these devices. In other embodiments, the third party devices can be configured through upgrading the code in these devices, or writing the configuration as an application to run on the devices through the device application-programming interface (API).

When executed, the configuration manager generates the employed network settings, and through a sequence of mostly automated steps requiring minimal user inputs, configures one or more network devices based on the NID, predetermined network configuration criteria, and automatically generated settings. In addition to using the configuration manager to establish an initial configuration of the home network 200, a user can restore a device 212 or 208 on the home network 200 in the event of a malfunction or breakdown of the network through reinstating the automated configuration; or to add new node devices 212 to the existing home network 200 originally set up based on the exemplary embodiments. This capability is advantageous for troubleshooting and maintaining the home network by a lay user.

In brief overview, referring to FIG. 3a, the user of the home network executes the configuration manager of the exemplary embodiments on the primary node device 212' for automatically configuring the gateway 208 of FIG. 2 and the primary node device 212', in accordance with the principles of the exemplary embodiments. In another embodiment, the configuration of the gateway 208 occurs manually, and the configuration of the primary node device 212' occurs automatically using the configuration manager. In yet another embodiment, it is possible to configure the gateway using a computing device that is not a network device, such as a PDA with a configuration manager suited to generating and downloading settings to a gateway through a wired or wireless link.

At step 304, the user loads and invokes the configuration manager on the primary node device 212'. In different embodiments, the configuration manager software is provided on a CD ROM or other portable storage media; or is factory-installed on the primary node device 212' as an application program.

During execution, the configuration manager prompts (step 308) the user to enter the NID. The user can enter the NID into the primary node device 212' through one of various input/output (I/O) devices (e.g., through a keypad, through remote control or through a graphical user interface (as in a PC-based utility)). Alternatively, the NID can be read or downloaded from another node device 212, either through a network connection or by a direct link.

After this information is entered, the configuration manager presents (step 312) the user with two options: 1) to configure the gateway 208 and the primary node device 212' through the primary node device 212'; or 2) a) to configure an additional node device 212 on the home network with a gateway, or b) to configure a node device on a network without a gateway. By selecting the one of these options (i.e., 2a or 2b), the user is instructing that either the home network 200 already has a configured gateway, or that the user is setting up a peer-to-peer network without a gateway, respectively.

In general, node devices 212 use a Network Interface Card (NIC) to interface with the LAN. The term NIC is used herein in a generic sense: namely, as a network interface that can be incorporated on a motherboard or on silicon, and can comprise a myriad of hardware and software forms. The NIC typically operates with appropriate software drivers.

The installation of the NIC and NIC driver can be considered logically independent of configuring node devices 212 for the LAN. The node devices 212 for the purpose of the description here are assumed to include a NIC. Whereas the principles of the exemplary embodiments can extend to combining the configuration of the node devices 212 with the installation of NIC drivers into a single process, such as by loading the NIC drivers on the same medium having the configuration manager, the description of the process 400 hereafter focuses on configuring the node device 212 for networking in the home network, and omits the installation of the NIC driver because such installation does not materially affect the configuring of the node device 212 nor does configuring the node device 212 on the network materially affect NIC driver installation.

In the event that multiple network interface cards (NICs) are detected on a node device 212, the configuration manager can prompt the user to select a NIC. The type of NIC determines the types of configuration parameters for which the configuration manager generates configuration settings. The user can also be presented with an option to set up a separate network profile for a NIC depending on the device type.

While the above applies to node device 212 installation in general, in reality, the primary node device 212' in the exemplary embodiment is already connected to the Internet and, therefore, has a working NIC that is used for sub-step 1) in step 312. Alternatively, PCs typically have built-in and configured Ethernet ports that can be easily used for configuring the gateway as described in the exemplary embodiment, even though that may not be the network connection eventually used by the node device.

When the user selects the first option, the configuration manager on the primary node device 212' reads (step 316) the aforementioned ISP and network settings stored on the primary node device 212' (e.g., for a personal computer running the Windows operating system, from the registry). As mentioned earlier, the primary node device 212' stores these ISP settings initially as part of establishing the broadband connection with the ISP 116. The configuration manager stores these ISP and network settings in a memory buffer (e.g., RAM) and creates a backup file on the primary node device 212' for recovery purposes. This backup file can also be edited to update the ISP and network settings to the gateway 208 in the future if the need arises (e.g., if the ISP changes domains, and changes configuration settings as a result). Alternatively, the user can enter the network settings employed by the ISP directly and for the first time in the configuration manager, which then creates the said backup file. This latter option is intended when the user is not a user with an existing broadband connection. The configuration manager also creates the LAN network settings for the gateway 208 based on the NID and the predetermined network settings for the gateway (step 318), and stores the same in a backup file on the primary node device 212'.

The Configuration manager then prompts (step 320) the user to power up the gateway 208, if it is not already done, and to connect (e.g., using an Ethernet cable) from the primary node device 212' to an appropriate physical data port on the LAN-side of the gateway 208, if not already done. In other embodiments, this communication between the gateway and the primary node device can be carried out using any suitable dedicated wired or wireless link such as USB, IR ports for wireless link, or Bluetooth, among others. The user signifies completion of this task in a dialog window produced on the computer screen by the configuration manager. The configuration manager causes the ISP settings employed, such as Host Name, MAC address, User Name and Password, to pass (step 324) from the primary node device 212' to the said physical data port of the gateway 208, wherein the configuration manager of the gateway writes the settings received to the registry of the gateway (step 328). This, thereby, enables the gateway 208 to connect to the ISP 116 through the modem 204. If the gateway 208 already has ISP settings (e.g., from a previous installation), this previous command of receiving said settings from a node device can overwrite these settings. In this scenario, the gateway's ISP settings can also be modified from a node device that is wirelessly networked on the LAN, in addition to the wired scenario described above. In another scenario, the user invokes the backup file on the node device, which then gives the user the option to modify and/or transfer the settings from the node device to the gateway, thereby achieving the same objective of getting the employed ISP settings to the gateway. The gateway may require a reboot, which is also part of the configuration script, in order to connect to the ISP.

The LAN settings generated by the configuration manager in step 318 are also transferred to the gateway 208 from the primary node device 212' in a similar manner to the transfer of ISP settings described earlier. The LAN settings are based on the NID as described earlier. In addition to the LAN settings based on the NID, the configuration manager of the node device also sends other network settings not dictated by the NID to the gateway (e.g., sets the gateway to DHCP server for the LAN and activates the server if the same is not dependent on the NID, but rather a default setting). In one embodiment, the configuration manager also sends the NID to the gateway, as the NID can be used to monitor the gateway by the ISP over the WAN, or generate settings within the gateway by the gateway's configuration manager. These settings can also be sent concurrently with the ISP settings (step 324) described above in order to minimize the steps employed to configure the gateway.

The configuration and reconfiguration of the gateway 208 as described above can be carried out completely or partially. Partial configurations include two types: 1) installing or updating WAN network parameters without affecting the LAN network settings, if any; and 2) installing or updating LAN network parameters without affecting the WAN network settings. Instances for the first type of partial configuration can arise for a recovery from corrupted ISP or WAN network settings on the gateway 208, or if the ISP or WAN network settings are modified. The backup file of the ISP and WAN network settings on the primary node device 212' can be modified, and the settings uploaded to the gateway 208. In one embodiment, another node device can read the gateway settings over a network connection and store the same in an editable backup file, which can then be used to update the gateway settings.

In one embodiment, the configuration manager generates a static private IP address for the primary node device 212', another node device, or for another device networked to the primary node device 212' by the general method described herein. The static IP address is generated across a predetermined set of private IP addresses on the LAN and selected by the user based on a sequential numbering scheme. That is, when a node device needs a static IP address, the configuration manager generates the static IP address outside the range of dynamic addresses, compatible with the subnet mask, default gateway setting, and with other network settings generated by the configuration manager, such that the user can sequentially allocate static IP addresses to devices without the user having to apply the network settings manually. For example, the user chooses static IP addresses #1 (with subsequent choices for static IP addresses being selected from #2, #3, #4, and so on), and the configuration manager automatically generates the complete address requirements. In one embodiment, the corresponding predetermined private LAN static IP addresses are preset on the gateway and mapped accordingly. In another embodiment, the configuration manager on the node device updates the routing table on the gateway with the new address through a connection as described earlier in transferring ISP settings from the primary node device to the gateway. In this manner, devices requiring static IP addresses are easily allocated static IP addresses on the LAN.

After the said settings are transmitted to the gateway 208, as described above (in steps 324 and 328), and upon receiving input from the user signifying such completion, the configuration manager on the node resets (step 332) the operation of the primary node device 212' to conform to the network requirements for the primary node device based upon the configuration manager and NID. In the current embodiment, the primary node device is set to receive network settings from the DHCP server of the gateway 208 (i.e., the primary node device 212' becomes DHCP client enabled). Subsequently, the primary node device 212' requests and receives (step 336) private IP addresses issued by the DHCP server of the gateway 208, and writes the settings to the primary node device 212' (step 340) in a memory, registry, and the like, thereof.

The Configuration manager achieves this reset by running a command, such as a Release/Renew of IP settings command. The gateway 208 has a DHCP server with an IP address pool, subnet mask, and default gateway IP address, from which to provide network settings to the primary node device 212'. If the primary node has other NICs (e.g., 802.11), the configuration manager on the primary node can be used to generate parameters for the other NICs too, in effect, enabling the primary node to be used as a secondary node subsequently once the gateway is configured.

In the current embodiment, in order to support Windows Networking, the configuration manager generates a unique Windows Workgroup name in step 318 and writes the same to the PC's registry in step 332. The Windows Workgroup name is based on the NID associated with the home network. In another embodiment, the user can choose a Windows Workgroup name where it may be a desirable personalized feature. The configuration manager also sets (step 332) file and print sharing for the NIC being configured to 'ON' state in Windows Networking. The configuration manager can prompt (step 350) the user to enter a unique node name that is used to identify the primary node device 212' on the home network depending on the operating system of the device. The configuration manager installation of the primary node device 212' is complete (step 360) when the user confirms the final entry. The primary node device 212' is thus configured and ready to operate on the home network.

FIG. 4 shows an embodiment of a process 400 for installing additional node devices 212 on the home network (i.e., LAN), or for installing a peer-to-peer network without a gateway.

Depending on the networking technology used, the employed LAN-protocol specific settings can vary. Although the described embodiment refers to a particular technology and platform, the principles of the exemplary embodiments apply to other types of technology, product platforms, and applications running on different types of networks and handling data, audio, video and combinations thereof, as will be appreciated by those skilled in the relevant art(s).

At step 404, the user selects the second option presented at step 312 of FIG. 3. Note that the user does not need to install the additional node device at the same time as when the gateway 208 and primary node device 212' are configured. At a subsequent time, the user can invoke and run the configuration manger on the additional node device 212, and select option 2a in step 312 in FIG. 3. In one embodiment, the configuration manager prompts the user to enter the NID associated with the home network in a graphical window presented in a graphical user interface, and, after receiving this NID, presents the two options (a and b) under #2 option of step 312 of FIG. 3 to the user (steps 304, 308, and 312 of FIG. 3). Other methods for providing the NID to the node device executing the configuration manager are described above.

In another exemplary embodiment, some device types are secondary nodes and rely on a pre-existing gateway, in which case step 312 of FIG. 3 need not be employed. In a further exemplary embodiment, a gateway can receive its NID and other parameters directly from the user rather than through a primary node device, in which case the configuration manager on the gateway can configure the gateway using the direct inputs. In another exemplary embodiment, the gateway receives the NID and/or LAN related settings over a WAN link from the ISP. In this embodiment, the gateway once configured to connect with the ISP can be managed by the ISP to control or monitor its LAN parameters, including the NID, through for example, SNMP.

In another exemplary embodiment of the node device, within the aforementioned embodiment (wherein the gateway receives the employed NID and/or settings from the ISP over the WAN), the configuration manager on the node device polls the gateway for the NID and/or configuration settings employed for the node device, and the node devices use a link with the gateway to receive the employed settings. The link can be a network connection (e.g., Ethernet), or a dedicated link (e.g., USB; IR or Bluetooth wireless).

If the configuration manager detects (step 408) more than one active NIC on the additional node device 212, the configuration manager can ask (step 408) the user to select the desired NIC to be used in the home network, and then the configuration manager automatically configures said settings for that NIC. Included in this process is the option to set up a network profile for the chosen NIC to enable the NIC to be used on different networks, or automatically creating a unique network profile for the home network.

The configuration manager then configures (step 412) the additional node device 212 based on the predetermined settings of the configuration manager and the NID. In the current exemplary embodiment, the node device 212 is set to DHCP client, so that the node device 212 can receive IP network settings from the Gateway DHCP Server. The configuration manager also automatically configures (step 412) the Windows Networking setting such that a default Workgroup name is created based on the NID associated with the home network. This Workgroup name is the same name as the Workgroup name given the primary node device 212'. Also, file and print sharing is turned "ON" for the NIC. During this process, the configuration manager automatically refreshes the device mode for such configuration changes to take effect. For example, on Windows 98 PC, the configuration manager causes an automatic release and renew of IP settings of the node device to effectively connect with the gateway. In an exemplary embodiment, a reboot of the node device can be employed, and in which case the user can be prompted to do.

The configuration manager also automatically configures (step 412) the employed LAN protocol settings for the appropriate NIC on the node device. For example, for 802.11b, the configuration manager configures the SSID and WEP encryption code based on the NID. These settings are the same SSID and WEP codes established for the gateway 208 and other node devices 212 using 802.11b in the home network.

The configuration manager can also prompt (step 424) the user to enter a unique node name for the node device, if the same is not already assigned to the said node device, and depending on the operating system of the node device. The network installation is now complete (step 428) for this particular node device. The additional node device is now connected to the gateway 208 and, thus, to the ISP 116 and to the Internet 104. The user can change the settings by going into appropriate windows settings if necessary or using the configuration manager backup file screens that are accessed from a tray icon.

The ability of the user to change network settings or manually configure the network devices is not excluded by the configuration manager and device design of the exemplary embodiments. Whereas the configuration manager of the exemplary embodiments determines and populates many of the employed network parameters on the network devices (208 and 212) based on the NID, in one embodiment, such settings can be manually changed. For example, the user can turn off file and print sharing, or change the Windows Workgroup name or SSID. However, to conform to networking requirements the user may have to make the same change(s) to the gateway 208 and to each node device 212 on the home network 200. In further exemplary embodiments, in order to maintain the usability of legacy products with the gateway and node devices, the user can access the settings generated by the configuration manager using the NID, and manually enter these settings in devices that do not have the benefit of running the exemplary configuration manager. In another embodiment, the configuration manager on one device can configure the network settings for a legacy device and write the same to the legacy device programmatically over a networked or non-networked link.

The network settings, including the ISP settings and LAN settings, are stored in a backup file that the user can modify for the purposes mentioned above (i.e., to modify settings or to read settings, among others). In one embodiment, the backup file is accessed through a set of pages that are linked to a tray icon, which in turn opens the pages when clicked. The user can navigate through the pages to access, read, or modify the employed settings and save changes. Upon doing so the new settings take effect, including sending new settings to the gateway, if necessary.

While the above steps relating to FIG. 3 and FIG. 4 describe an exemplary embodiment, in other embodiments, different steps, including additional steps, can be employed to either give the user more or fewer options, or to conform to a different device type, or to different network architecture and predetermined network settings, as will be appreciated by those skilled in the relevant art(s).

While the above steps relating to FIG. 3 and FIG. 4 describe exemplary embodiments with reference to certain platforms, operating systems, protocols and parameters, in general the exemplary embodiments can be employed with other platforms, operating systems, protocols and parameters, as will be appreciated by those skilled in the relevant art(s). The exemplary embodiments can be applied to any suitable home network type where a plurality of network settings is employed, such that the networked devices have compatible network settings. For example, wherein the description above refers to 802.11b using SSID and WEP, further embodiments can include 802.11a, e, g, or i, employing 802.1x or WPA security methods. Similarly, the network can use Zigbee, HomePlug or UWB rather than, or in addition to, 802.11 and Ethernet. In the TCP/IP environment, SNMP can be used to manage the NID and settings. It is also likely that the network may be a non-TCP/IP network, wherein the networking parameters, configuration procedure and user interface may differ from the illustrative descriptions given above. Similarly, the transfer of data between devices described above can be done in a variety of formats that the configuration managers send and receive data with. Examples of these are, HTTP, FTP and TFTP, character strings, and encapsulated in other packet formats such as Ethernet.

In the exemplary embodiments, the NID and SID formats are determined by the manufacturer and based on a unique format in order to realize the benefits thereof. In further exemplary embodiments, the NID and SID formats can be managed by a central authority and issued to different manufacturers, as is the case with IP addresses and MAC addresses. In one embodiment, the NID can be the serial number associated with a software or with a network device, such as the gateway's serial number or MAC address. In another embodiment, the NID is not provided with a specific embodiment of a networking product (e.g., a router or NIC package), but rather provided by the manufacturer to a user upon registration of a product for the first time with the manufacturer, so that the NID is, in fact, a customer associated identifier, such as a customer ID. In another embodiment, the format of the NID is specified with unspecified characters that the user allocates. This is applied, as an example, in cases where the user needs to control the NID, and change it from time to time for security reasons, for example. In another embodiment, the NID is the probabilistic NID described earlier.

The configuration manager can be implemented in a number of formats, and its user interface can also be varied depending on the device type, functionality, and underlying platforms and protocols. The configuration manager can be implemented through a setup wizard, which automates settings and installation process. The configuration manager can be bundled with external adapters; node devices, including PCs; routers; network kits; stand alone software package; among others. The configuration manager can also ensure that network adapters are installed and configured, and facilitate in the installation and configuration of the same; network stacks are installed and configured, and facilitate in the installation and configuration of the same. The configuration manager can launch an installation and configuration program, for example from a tray icon on a PC, for a graphical representation of the network, network settings, and user interface for implementing changes to the same. The process implemented by the configuration manager can be in a different order in further exemplary embodiments. For example, the configuration manager can install the installation and configuration program before running the installation wizard described above. The configuration manger can implement an auto run process to control the exact sequence. At minimum, the configuration manager comprises one configuration script stored in memory that processes the NID and implements a predetermined configuration script. In one embodiment, it reads settings from registry, stores them in a backup file and transmits them to another device. In another embodiment, it receives settings, which can include the NID, from another device, and processes these settings. In one embodiment, the configuration manager writes settings to registry. In general, any suitable standard or proprietary, programming or interpretive language can be used to produce the computer-readable software programs. The software programs can be stored on or in one or more articles of manufacture as source code, object code, interpretive code, or executable code running on architecture of hardware devices as earlier described. Examples of such languages include C, C++, Pascal, JAVA, BASIC, Visual Basic, and Visual C++, among others; and can be operated on Windows 98SE, ME, XP, 2000 or later versions, Linux, and MAC OS, among others; or in the embedded environment on Windows PocketPC, Symbian, PSOS, Palm, VxWorks, embedded Linux, among others. The configuration manager can also be configured to be integrated with third party programs, such as Windows Zero Configuration utility for 802.11 in Microsoft Windows XP operating system. The configuration manager can be configured to coexist with third party program, such as such as Windows Zero Configuration utility for 802.11 in Microsoft Windows XP operating system, without integrating with it.

Figure 5:
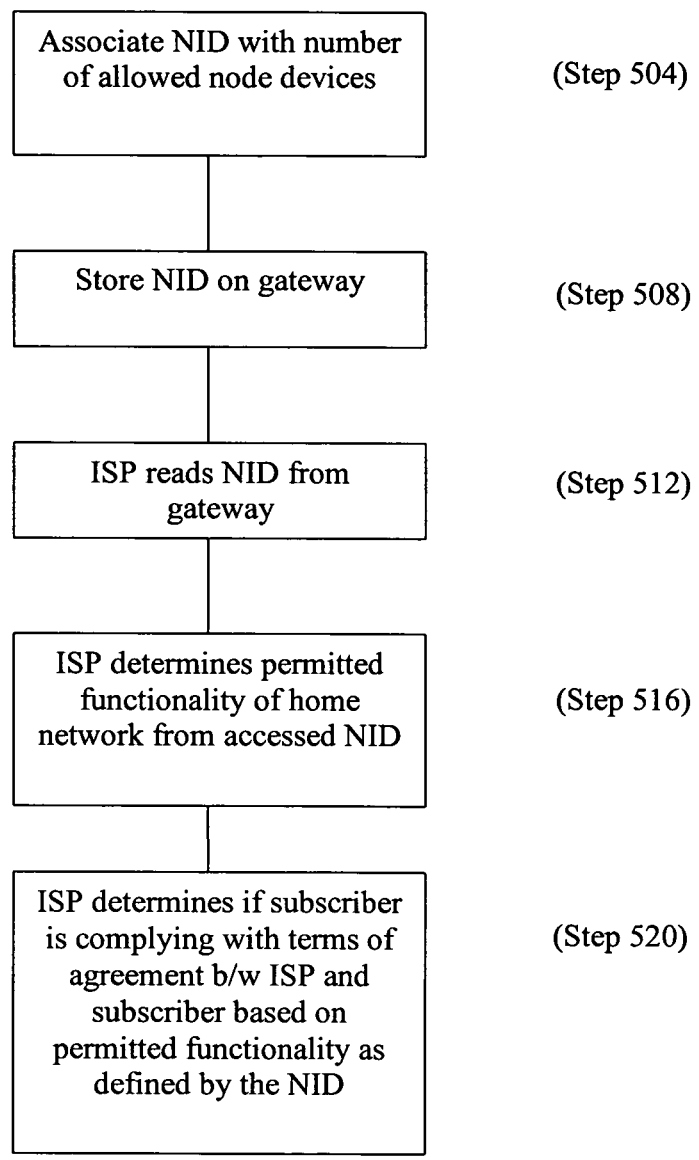
FIG. 5 is a flow diagram of an exemplary embodiment of a process by which an Internet Service Provider can monitor a home network based on a Unique Network Identifier (NID) stored at the gateway device.

FIG. 5 shows an exemplary embodiment of a process 500 by which an ISP (116 in FIG. 2) is able to monitor the gateway device over the WAN, and thereby assess the node devices (212 in FIG. 2) that are connected to a home network. In step 504, an NID is associated with a certain number of allowable node devices that can be connected to the home network 200. This NID is installed (Step 508) on the gateway 208. The ISP 116 can monitor, and in one embodiment, download the NID to the gateway 208. The gateway 208 stores the NID in its registry that can be accessed by the ISP 116 (for example through an SNMP MIB implementation). In the exemplary embodiment described above, the NID operates to limit the number of node devices 212 connected to the LAN by controlling the pool of DHCP IP addresses allowed by the gateway's DHCP server.

In the exemplary embodiment, the ISP 116 reads (Step 512) the NID over the WAN connection. The ISP 116 determines the functionality permitted by that NID. By reading the NID over the WAN link, the ISP 116 ensures (Step 520) that the subscriber is complying with his or her terms of the service agreement. In an exemplary embodiment, the ISP can change the gateway's NID over the WAN, and thereby instruct the gateway to change the number of allowed DHCP clients on the LAN. This modifies the functionality of the LAN by requiring the user to change the NID on the node devices. In a further exemplary embodiment, the ISP can shut down the LAN by modifying or removing the NID in the gateway over the WAN. The NID on the gateway can be processed to generate parameters by the configuration manger on the gateway, or it can be a static identifier read from the gateway, depending on the design of the gateway. The gateway can also transmit the NID so downloaded by the ISP, or network settings generated using the NID, to other devices on the network enabling configuration of the home network.

The above-described devices and subsystems of the exemplary embodiments of FIGS. 1-7 can include, for example, any suitable servers, workstations, Personal Computers (PCs), laptop computers, Personal Digital Assistants (PDAs), Internet appliances, handheld devices, cellular telephones, wireless devices, other devices, etc., capable of performing the processes of the exemplary embodiments. The devices and subsystems can communicate with each other using any suitable protocol and can be implemented, for example, using the computer system 800 of FIG. 8. The devices and subsystems of the exemplary embodiments of FIGS. 1-7 can communicate with each other over a communications network, such as the Internet, an intranet, a local area network (LAN), and the like.

One or more interface mechanisms can be used in the exemplary embodiments of FIGS. 1-7 including, for example, Internet access, telecommunications in any suitable form, for example, voice, modem, wireless communications media, and the like. Accordingly, the communications network employed in the exemplary embodiments of FIGS. 1-7 (e.g., the WAN) can include, for example, one or more wired or wireless communications networks, cellular communications networks, 3G communications networks, Public Switched Telephone Network (PSTNs), Packet Data Networks (PDNs), the Internet, intranets, and/or combination thereof, and the like.

It is to be understood that the exemplary embodiments of FIGS. 1-7 are for exemplary purposes, as many variations of the specific hardware and software used to implement the described embodiments are possible, as can be appreciated by those skilled in the relevant art(s). For example, the functionality of the devices and the subsystems of the exemplary embodiments of FIGS. 1-7 can be implemented via one or more programmed computer systems or devices.

To implement such variations as well as other variations, a single computer system (e.g., the computer system 800 of FIG. 8) can be programmed to perform the special purpose functions of one or more of the devices and subsystems of the exemplary embodiments of FIGS. 1-7. On the other hand, two or more programmed computer systems or devices can be substituted for any one of the devices and subsystems of the exemplary embodiments of FIGS. 1-7. Accordingly, principles and advantages of distributed processing, such as redundancy, replication, etc., also can be implemented, as desired, for example, to increase the robustness and performance of the exemplary embodiments of FIGS. 1-7.

The exemplary embodiments of FIGS. 1-7 can store information relating to various exemplary processes described herein. This information can be stored in one or more memories, such as a hard disk, optical disk, magneto-optical disk, RAM, and the like, of the devices of the exemplary embodiments of FIGS. 1-7. One or more databases of the devices and subsystems of the exemplary embodiments of FIGS. 1-7 can store the information used to implement the exemplary embodiments of the present invention. The databases can be organized using data structures (e.g., records, tables, arrays, fields, graphs, trees, and/or lists) included in one or more memories, such as the memories listed above or any suitable storage devices, such as the storage devices listed below in the discussion of FIG. 8, and the like.

All or a portion of the exemplary embodiments of FIGS. 1-7 can be conveniently implemented using one or more conventional general purpose computer systems, microprocessors, digital signal processors, micro-controllers, and the like, programmed according to the teachings of the embodiments of the present invention (e.g., using the computer system of FIG. 8), as can be appreciated by those skilled in the computer and software art(s). Appropriate software can be readily prepared by programmers of ordinary skill based on the teachings of the present disclosure, as can be appreciated by those skilled in the software art. Further, the exemplary embodiments of FIGS. 1-7 can be implemented on the World Wide Web (e.g., using the computer system of FIG. 8). In addition, the exemplary embodiments of FIGS. 1-7 can be implemented by the preparation of application-specific integrated circuits or by interconnecting an appropriate network of conventional component circuits, as can be appreciated by those skilled in the electrical art(s).

Figure 8:
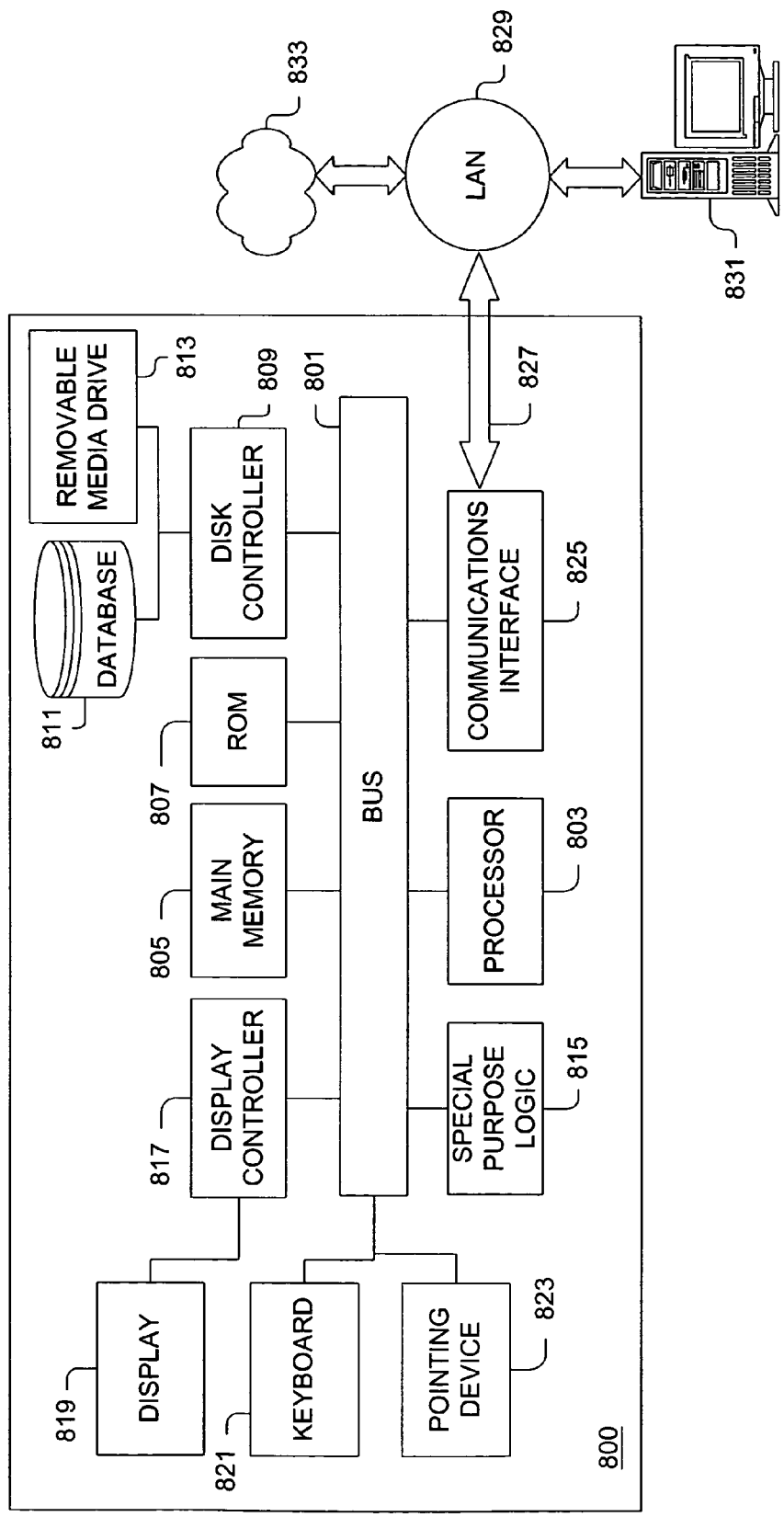
FIG. 8 illustrates an exemplary computer system, which can be programmed to perform one or more of the processes of the described exemplary embodiments.

FIG. 8 illustrates a computer system 800 upon which the exemplary embodiments (e.g., the devices and subsystems of the exemplary embodiments of FIGS. 1-7) can be implemented. The various embodiments can be implemented on a single such computer system, or a collection of multiple such computer systems. The computer system 800 can include a bus 801 or other communication mechanism for communicating information, and a processor 803 coupled to the bus 801 for processing the information. The computer system 800 also can include a main memory 805, such as a random access memory (RAM), other dynamic storage device (e.g., dynamic RAM (DRAM), static RAM (SRAM), synchronous DRAM (SDRAM)), etc., coupled to the bus 801 for storing information and instructions to be executed by the processor 803.

In addition, the main memory 805 also can be used for storing temporary variables or other intermediate information during the execution of instructions by the processor 803. The computer system 800 further can include a ROM 807 or other static storage device (e.g., programmable ROM (PROM), erasable PROM (EPROM), electrically erasable PROM (EEPROM), etc.) coupled to the bus 801 for storing static information and instructions.

The computer system 800 also can include a disk controller 809 coupled to the bus 801 to control one or more storage devices for storing information and instructions, such as a magnetic hard disk 811, and a removable media drive 813 (e.g., floppy disk drive, read-only compact disc drive, read/write compact disc drive, compact disc jukebox, tape drive, and removable magneto-optical drive). The storage devices can be added to the computer system 800 using an appropriate device interface (e.g., small computer system interface (SCSI), integrated device electronics (IDE), enhanced-IDE (E-IDE), direct memory access (DMA), or ultra-DMA).

The computer system 800 also can include special purpose logic devices 815, such as application specific integrated circuits (ASICs), full custom chips, configurable logic devices, e.g., simple programmable logic devices (SPLDs), complex programmable logic devices (CPLDs), field programmable gate arrays (FPGAs), and the like, for performing special processing functions, such as signal processing, image processing, speech processing, optical character recognition (OCR), voice recognition, text-to-speech and speech-to-text processing, communications functions, wired and wireless networking functions, and the like.

The computer system 800 also can include a display controller 817 coupled to the bus 801 to control a display 819, such as a cathode ray tube (CRT), liquid crystal display (LCD), television display, active matrix display, plasma display, touch display, and the like, for displaying or conveying information to a computer user. The computer system can include input devices, such as a keyboard 821 including alphanumeric and other keys and a pointing device 823, a microphone for inputting voice commands, keypads, digital and analog dials and switches, IR and RF remote controls, and the like, for interacting with a computer user and providing information to the processor 803. The pointing device 823 can include, for example, a mouse, a trackball, a pointing stick, etc. or voice recognition processor, etc., for communicating direction information and command selections to the processor 803 and for controlling cursor movement on the display 819. In addition, a printer can provide printed listings of the data structures/information of the exemplary embodiments of FIGS. 1-7 or any other data stored and/or generated by the computer system 800.

The computer system 800 can perform all or a portion of the processing steps of the invention in response to the processor 803 executing one or more sequences of one or more instructions contained in a memory, such as the main memory 805. Such instructions can be read into the main memory 805 from another computer readable medium, such as the hard disk 811 or the removable media drive 813. Execution of the arrangement of instructions contained in the main memory 805 causes the processor 803 to perform the process steps described herein. One or more processors in a multi-processing arrangement also can be employed to execute the sequences of instructions contained in the main memory 805. In alternative embodiments, hard-wired circuitry can be used in place of or in combination with software instructions. Thus, embodiments are not limited to any specific combination of hardware circuitry and/or software.

Stored on any one or on a combination of computer readable media, the embodiments of the present invention can include software for controlling the computer system 800, for driving a device or devices for implementing the invention, and for enabling the computer system 800 to interact with a human user (e.g., users of the exemplary embodiments of FIGS. 1-7, etc.). Such software can include, but is not limited to, device drivers, firmware, operating systems, development tools, applications software, etc. Such computer readable media further can include the computer program product of an embodiment of the present invention for performing all or a portion (if processing is distributed) of the processing performed in implementing the invention. Computer code devices of the embodiments of the present invention can include any interpretable or executable code mechanism, including but not limited to scripts, interpretable programs, dynamic link libraries (DLLs), Java classes and applets, complete executable programs, etc. Moreover, parts of the processing of the embodiments of the present invention can be distributed for better performance, reliability, and/or cost.

The computer system 800 also can include a communication interface 825 coupled to the bus 801. The communication interface 825 can provide a two-way data communication coupling to a network link 827 that is connected to, for example, a LAN 829, or to another communications network 833 (e.g., a wide area network (WAN), a global packet data communication network, such as the Internet, etc.). For example, the communication interface 825 can include a digital subscriber line (DSL) card or modem, an integrated services digital network (ISDN) card, a cable modem, a telephone modem, etc., to provide a data communication connection to a corresponding type of telephone line. As another example, the communication interface 825 can include a local area network (LAN) card (e.g., for Ethernet™, an Asynchronous Transfer Model (ATM) network, etc.), etc., to provide a data communication connection to a compatible LAN. Wireless links also can be implemented. In any such implementation, the communication interface 825 can send and receive electrical, electromagnetic, or optical signals that carry digital data streams representing various types of information. Further, the communication interface 825 can include peripheral interface devices, such as a Universal Serial Bus (USB) interface, a PCMCIA (Personal Computer Memory Card International Association) interface, etc.

The network link 827 typically can provide data communication through one or more networks to other data devices. For example, the network link 827 can provide a connection through the LAN 829 to a host computer 831, which has connectivity to the network 833 or to data equipment operated by a service provider, for example, as described in the exemplary embodiments of FIGS. 1-7. The LAN 829 and the network 833 both can employ electrical, electromagnetic, or optical signals to convey information and instructions. The signals through the various networks and the signals on the network link 827 and through the communication interface 825, which communicate digital data with computer system 800, are exemplary forms of carrier waves bearing the information and instructions.

The computer system 800 can send messages and receive data, including program code, through the network 829 and/or 833, the network link 827, and the communication interface 825. In the Internet example, a network device (e.g., gateway) can transmit or receive requested code for implementing an embodiment of the present invention through the network 833, the LAN 829 and the communication interface 825. The processor 803 can execute the transmitted code while being received and/or store the code in the storage devices 811 or 813, or other non-volatile storage for later execution. In this manner, computer system 800 can obtain application code in the form of a carrier wave.

The term computer readable medium as used herein can refer to any medium that participates in providing instructions to the processor 803 for execution. Such a medium can take many forms, including but not limited to, non-volatile media, volatile media, transmission media, etc. Non-volatile media can include, for example, optical or magnetic disks, magneto-optical disks, etc., such as the hard disk 811 or the removable media drive 813. Volatile media can include dynamic memory, etc., such as the main memory 805. Transmission media can include coaxial cables, copper wire and fiber optics, including the wires that make up the bus 801. Transmission media also can take the form of acoustic, optical, or electromagnetic waves, such as those generated during radio frequency (RF) and infrared (IR) data communications.

As stated above, the computer system 800 can include at least one computer readable medium or memory for holding instructions programmed according to the teachings of the invention and for containing data structures, tables, records, or other data described herein. Common forms of computer-readable media can include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media can be involved in providing instructions to a processor for execution. For example, the instructions for carrying out at least part of the embodiments of the present invention can initially be borne on a magnetic disk of a remote computer connected to either of the networks 829 and 833. In such a scenario, the remote computer can load the instructions into main memory and send the instructions, for example, over a telephone line using a modem. A modem of a local computer system can receive the data on the telephone line and use an infrared transmitter to convert the data to an infrared signal and transmit the infrared signal to a portable computing device, such as a PDA, a laptop, an Internet appliance, etc. An infrared detector on the portable computing device can receive the information and instructions borne by the infrared signal and place the data on a bus. The bus can convey the data to main memory, from which a processor retrieves and executes the instructions. The instructions received by main memory can optionally be stored on storage device either before or after execution by processor.

The exemplary embodiments for configuring network settings for devices on a home network, including a PC with a preexisting Internet connection to an ISP, and a gateway, can include ISP related settings being read from the PC registry and stored in a memory of the PC. The LAN network settings used for the network can be programmatically generated using one or more user input parameters and the parameters can be stored in the memory of the PC. The PC can then can be programmatically reset so as to receive the settings from the gateway. Connecting the PC to gateway and programmatically transmitting the settings to the gateway stores the settings in the gateway, thereby enabling the gateway to have ISP and LAN parameter settings. The settings in the memory of the PC can be stored on the PC in a user editable backup file. When configuring network settings for devices on a home network, including a PC without a preexisting Internet connection to an ISP, and a gateway, the ISP related settings can be input on the PC programmatically or by means of a GUI, and stored in the memory of the PC. When configuring network settings on a home network device, LAN network settings used for the network can be programmatically generated using one or more input parameters that algorithmically generate a plurality of network settings, which can be stored in a memory of the device. The configuration settings can be generated on a plurality of such devices, can be programmatically written to a registry of such devices through a sequence of predetermined configuration steps, and can be stored in a user editable backup file on such devices.

While the present invention have been described in connection with a number of exemplary embodiments and implementations, the present invention is not so limited but rather covers various modifications and equivalent arrangements, which fall within the purview of the appended claims.

What is claimed is:

1. An electronic device-implemented method for configuring a communications network, the method comprising:
providing, at an electronic device having an interface for communicating with the communications network, a network identifier (NID) that identifies the communications network, the NID comprising a set of characters assigned to a specific instantiation of the communications network;
receiving a request that a node device be configured for use in the communications network;
inputting the NID to one or more algorithms or equations;
using the one or more algorithms or equations, applying the NID to generate values for a plurality of parameters describing a configuration for the node device, wherein the values are automatically generated from the NID; and
forwarding the values derived from the NID to the node device.

2. The method of claim 1, wherein the plurality of parameters comprise at least one of TCP/IP settings, Media Access Control (MAC) settings, Physical Layer (PHY) settings, and LAN protocol settings.

3. The method of claim 2, wherein the parameters comprise LAN protocol settings and the LAN protocol settings comprise a power line networking protocol, a phone line networking protocol, a coaxial cable networking protocol, a fiber optic cable networking protocol, and a twisted pair wire networking protocol.

4. The method of claim 2, wherein the parameters comprise LAN protocol settings and the LAN protocol settings comprise an 802.11x protocol.

5. The method of claim 4, further comprising setting at least one of Network Name parameters, SSID parameters, WEP parameters, and WPA parameters based on the LAN protocol settings.

6. The method of claim 1, wherein the NID represents a plurality of network attributes in a single character set, wherein the network configuration manager interprets the NID and implements the network attributes.

7. The method of claim 1, wherein the NID uniquely identifies the communications network using a set of characters uniquely assigned to a specific instantiation of the communications network.

8. The method of claim 1, wherein the NID probabilistically identifies the communications network.

9. The method of claim 1, wherein generation of the plurality of parameters is repeatable such that the electronic device generates the same parameter each time the parameter is generated using a specific NID.

10. The method of claim 1, wherein generating the plurality parameters further uses predetermined network settings for the node device.

11. The method of claim 1, wherein the configuration manager uses the NID to limit the size of the home network.

12. The method of claim 1, wherein the plurality of parameters are written to a memory of the node device.

13. The method of claim 1, wherein the electronic device is a network gateway device for connecting two different communication networks.

14. The method of claim 13, wherein the two different communication networks are a WAN communications network and a LAN communications network.

15. The method of claim 1, wherein the configuration of the node device is compatible to a set of configuration settings that are active on a second device in the communications network.

16. The method of claim 1, further comprising configuring the node device using the configuration.

17. The method of claim 1, wherein at least one of the parameters in the configuration of the node device is received from a second device in the communications network.

18. The method of claim 1, wherein at least one of the parameters in the configuration of the node device is a TCP/IP networking setting.

19. The method of claim 18, further comprising setting an allowable subnet mask for the communications network based on the TCP/IP networking setting.

20. The method of claim 18, further comprising generating one or more static IP addresses, and issuing one of the static IP addresses to the device based on a serialized number or alphabetical sequence association, such that the static IP addresses are compliant with the TCP/IP networking setting.

21. The method of claim 1, further comprising configuring networking between the communications network and a service provider based on one or more of the generated parameters.

22. A nontransitory electronic device readable storage medium comprising instructions that, when executed by one or more processors, causes the processors to:

provide, at an electronic device having an interface for communicating with a communications network, a network identifier (NID) that identifies the communications network, the NID comprising a set of characters assigned to a specific instantiation of the communications network;

receive a request that a node device be configured for use in the communications network;

input the NID to one or more algorithms or equations;

using the one or more algorithms or equations, apply the NID to generate values for a plurality of parameters describing a configuration for the node device, wherein the values are automatically generated from the NID; and write the plurality of parameters to a memory of the node device.

23. The storage medium of claim 22, wherein the plurality of parameters comprise at least one of TCP/IP settings, Media Access Control (MAC) settings, Physical Layer (PHY) settings, and LAN protocol settings.

24. The storage medium of claim 23, wherein the parameters comprise LAN protocol settings and the LAN protocol settings comprise a power line networking protocol, a phone line networking protocol, a coaxial cable networking protocol, a fiber optic cable networking protocol, and a twisted pair wire networking protocol.

25. The storage medium of claim 23, wherein the parameters comprise LAN protocol settings and the LAN protocol settings comprise an 802.11x protocol.

26. The storage medium of claim 25, further comprising setting at least one of Network Name parameters, SSID parameters, WEP parameters, and WPA parameters based on the LAN protocol settings.

27. The storage medium of claim 22, wherein the NID represents a plurality of network attributes in a single character set, wherein the electronic device interprets the NID and implements the network attributes.

28. The storage medium of claim 22, wherein the configuration of the node device is compatible to a set of configuration settings that are active on a second device in the communications network.

29. The storage medium of claim 22, further comprising instructions for configuring the node device using the configuration.

30. The storage medium of claim 22, wherein at least one of the parameters in the configuration of the node device is received from a second device in the communications network.

31. The storage medium of claim 22, wherein at least one of the parameters in the configuration of the device is a TCP/IP networking setting.

32. The storage medium of claim 22, further comprising instructions for configuring networking between the communications network and a service provider based on one or more of the generated parameters.

33. A computer-implemented method for configuring a gateway in a communications network, the method comprising:

inputting a network identifier (NID) to one or more algorithms or equations, the NID identifying the communications network and comprising a set of characters assigned to a specific instantiation of the communications network;

using the one or more algorithms or equations, applying the NID to generate a plurality of parameters describing a configuration for the gateway, wherein the plurality of parameters are each automatically generated from a network identifier (NID), the creating of the parameters being performed in response to a request to configure the gateway and the applying the NID being performed by a network configuration manager running on a node device;

establishing a connection between the node device and the gateway;

uploading, using the network configuration manager, the configuration to the gateway;

changing settings on the node device to one or more LAN settings predicated by the network configuration manager;

receiving, from the gateway, one or more network settings at the node device; and writing the network settings to a memory of the node device.

34. A computer-implemented method for configuring a node device in a communications network, the method comprising:

detecting a network interface controller (NIC) that is active on the node device;

inputting a network identifier (NID) to one or more algorithms or equations, the NID identifying the communications network and comprising a set of characters assigned to a specific instantiation of the communications network;

using the one or more algorithms or equations, applying the NID to generate, using a network configuration manager, a plurality of parameters describing a configuration for the NIC, wherein the plurality of parameters are automatically generated from a network identifier (NID), the creating of the parameters being performed in response to a request to configure the NIC;

writing the generated configuration parameters to a memory of the node device; and configuring, using the network configuration manager, the NIC using the generated configuration parameters.

35. The method of claim 34, wherein detecting an NIC comprises detecting a plurality of NICs that are active on the node device, and further comprising receiving a selection of an NIC from among the plurality of NICs to be configured.

36. A computer-implemented method for configuring a node device in a communications network, the method comprising:

defining a network identifier (NID) unique to an instantiation of the local area network and for authenticating a node device having an interface for connection with the local area network;

inputting the NID to one or more algorithms or equations;

using the one or more algorithms or equations, applying the NID to generate a plurality of data link layer parameters required for authenticating the node device, wherein a value of each of the plurality of data link parameters is automatically generated from the NID; and configuring the node device by applying the generated data link layer parameters using a configuration manager for establishing a secure data link layer communication between the node device and the local area network, wherein configuring the node device comprises writing the data link layer parameters to a memory of the node device.

37. The method of claim 36, wherein the plurality of data link layer parameters include Media Access Control (MAC) settings.

38. The method of claim 36, wherein the plurality of data link layer parameters include Network Name parameters, SSID parameters, WEP parameters, and WPA parameters.

39. The method of claim 36, wherein the node device is authenticated by a gateway connected to the local area network.

40. The method of claim 1, wherein the electronic device and the node device are the same device such that the node device is configured independently.

41. The storage medium of claim 22, wherein the electronic device and the node device are the same device such that the node device is configured independently.

* * * * *